（12) United States Patent
Hu et al.

(10) Patent No.: US 12,285,882 B2
(45) Date of Patent: *Apr. 29, 2025

(54) STRONG AND TOUGH STRUCTURAL WOOD MATERIALS, AND METHODS FOR FABRICATING AND USE THEREOF

(71) Applicant: UNIVERSITY OF MARYLAND, COLLEGE PARK, College Park, MD (US)

(72) Inventors: Liangbing Hu, Potomac, MD (US); Mingwei Zhu, Nanjing (CN); Jianwei Song, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/980,702

(22) Filed: Nov. 4, 2022

(65) Prior Publication Data

US 2023/0166427 A1 Jun. 1, 2023

Related U.S. Application Data

(63) Continuation of application No. 17/408,695, filed on Aug. 23, 2021, now Pat. No. 11,554,514, which is a
(Continued)

(51) Int. Cl.
*B32B 21/13* (2006.01)
*B01D 11/02* (2006.01)
(Continued)

(52) U.S. Cl.
CPC .......... *B27K 5/065* (2013.01); *B01D 11/0288* (2013.01); *B27K 3/0278* (2013.01);
(Continued)

(58) Field of Classification Search
None
See application file for complete search history.

(56) References Cited

U.S. PATENT DOCUMENTS

| 4,012,280 A | 3/1977 | Hutchinson |
| 4,908,099 A | 3/1990 | DeLong |

(Continued)

FOREIGN PATENT DOCUMENTS

| CA | 2608174 A1 | 4/2009 |
| CN | 85102125 A | 1/1987 |

(Continued)

OTHER PUBLICATIONS

JP Office Action, issued Dec. 6, 2022 (Dec. 6, 2022), in Japan Patent Application No. 2019-555858. (7 pages).
(Continued)

*Primary Examiner* — Alexander S Thomas
(74) *Attorney, Agent, or Firm* — Rowan Tree Law Group, PLLC; Frederick F. Rosenberger

(57) ABSTRACT

A super strong and tough densified wood structure is formed by subjecting a cellulose-based natural wood material to a chemical treatment that partially removes lignin therefrom. The treated wood retains lumina of the natural wood, with cellulose nanofibers of cell walls being aligned. The treated wood is then pressed in a direction crossing the direction in which the lumina extend, such that the lumina collapse and any residual fluid within the wood is removed. As a result, the cell walls become entangled and hydrogen bonds are formed between adjacent cellulose nanofibers, thereby improving the strength and toughness of the wood among other mechanical properties. By further modifying, manipulating, or machining the densified wood, it can be adapted to various applications.

30 Claims, 11 Drawing Sheets

Related U.S. Application Data continuation of application No. 16/604,005, filed as application No. PCT/US2018/026742 on Apr. 9, 2018, now Pat. No. 11,130,256.

(60) Provisional application No. 62/627,600, filed on Feb. 7, 2018, provisional application No. 62/483,828, filed on Apr. 10, 2017.

(51) Int. Cl.
| | |
|---|---|
| *B27K 3/02* | (2006.01) |
| *B27K 3/16* | (2006.01) |
| *B27K 3/20* | (2006.01) |
| *B27K 3/36* | (2006.01) |
| *B27K 3/38* | (2006.01) |
| *B27K 3/48* | (2006.01) |
| *B27K 5/06* | (2006.01) |
| *B32B 7/12* | (2006.01) |
| *D21C 3/02* | (2006.01) |
| *D21C 3/12* | (2006.01) |
| *D21C 9/00* | (2006.01) |

(52) U.S. Cl.
CPC ............... *B27K 3/16* (2013.01); *B27K 3/20* (2013.01); *B27K 3/36* (2013.01); *B27K 3/38* (2013.01); *B27K 3/48* (2013.01); *B32B 7/12* (2013.01); *B32B 21/13* (2013.01); *D21C 3/022* (2013.01); *D21C 3/12* (2013.01); *D21C 9/005* (2013.01); *D21C 9/007* (2013.01); *B27K 2240/10* (2013.01); *B27K 2240/30* (2013.01); *B27K 2240/70* (2013.01); *B32B 2419/00* (2013.01); *B32B 2479/00* (2013.01); *B32B 2571/00* (2013.01)

(56) References Cited

U.S. PATENT DOCUMENTS

| | | | |
|---|---|---|---|
| 5,188,707 | A | 2/1993 | Gordy |
| 8,221,894 | B2 | 7/2012 | Dengyun et al. |
| 11,130,256 | B2 * | 9/2021 | Hu .................... B27K 3/153 |
| 11,554,514 | B2 * | 1/2023 | Hu ........................ B32B 7/12 |
| 2008/0221263 | A1 | 9/2008 | Kanagasabapathy et al. |
| 2009/0298149 | A1 | 12/2009 | Wang et al. |
| 2014/0370319 | A1 | 12/2014 | Vetter et al. |
| 2020/0238565 | A1 | 7/2020 | Hu et al. |
| 2020/0282591 | A1 | 9/2020 | Hu et al. |

FOREIGN PATENT DOCUMENTS

| | | |
|---|---|---|
| CN | 101579873 A | 11/2009 |
| CN | 102791802 A | 11/2012 |
| CN | 104774485 A | 7/2015 |
| CN | 104875247 A | 9/2015 |
| CN | 105563570 A | 5/2016 |
| CN | 106493815 A | 3/2017 |
| EP | 1908562 A2 | 4/2008 |
| JP | 2015-077740 A | 4/2015 |
| WO | WO 2016/173743 A1 | 11/2016 |
| WO | WO 2018/187238 A1 | 10/2018 |
| WO | WO 2019/055789 A1 | 3/2019 |

OTHER PUBLICATIONS

KR Office Action, issued Oct. 31, 2022 (Oct. 31, 2022), in Korean Patent Application No. 10-2019-7033221. (10 pages).
Notice of Allowance, issued Nov. 28, 2022 (Nov. 28, 2022), in parent U.S. Appl. No. 17/408,695. (3 pages).
Notice of Allowance, issued Dec. 14, 2022 (Dec. 14, 2022), in parent U.S. Appl. No. 17/408,695. (3 pages).
Abstract for Yano et al., "Effects of high temperature and high pressure alkaline pretreatments for the production of high strength resin-impregnated compressed wood," *Journal of the Japan Wood Research Society*, 2005, 47(40): pp. 337-343. (1 page).
Blanchette et al., "Changes in structural and chemical components of wood delignified by fungi," *Wood Science and Technology*, 1985, 19: pp. 35-46. (12 pages).
Chen et al., "All-wood, low tortuosity, aqueous, biodegradable supercapacitors with ultra-high capacitance," *Energy & Environmental Science*, 2017, 10: pp. 538-545. (8 pages).
CN Office Action, issued Nov. 16, 2020 (Nov. 16, 2020), in Chinese Application No. 201880037695.7. (33 pages).
CN Office Action, issued Jul. 6, 2021 (Jul. 6, 2021), in Chinese Application No. 201880037695.7. (10 pages).
CN Office Action, issued Dec. 8, 2021 (Dec. 8, 2021), in Chinese Application No. 201880037695.7. (6 pages).
EP Office Action, issued Oct. 15, 2020 (Oct. 15, 2020), in European Patent Application No. 18783970.9. (7 pages).
EP Office Action, issued Nov. 3, 2021 (Nov. 3, 2021), in European Patent Application No. 18783970.9. (7 pages).
Fang et al., "Densification of wood veneers by compression combined with heat and steam," *Eur. J. Wood Prod.*, 2012, 70: pp. 155-163. (9 pages).
Fratzl, P., "Wood made denser and stronger," *Nature*, Feb. 2018, 554: pp. 172-173. (2 pages).
Frey et al., "Delignified and Densified Cellulose Bulk Materials with Excellent Tensile Properties for Sustainable Engineering," *ACS Appl. Mater. Interfaces*, 2018, 10: pp. 5030-5037. (8 pages).
Gan et al., "Dense, Self-Formed Char Layer Enables a Fire-Retardant Wood Structural Material," *Advanced Functional Materials*, 2019, 29: 1807444. (9 pages).
Gan et al., "Fire-Resistant Structural Material Enabled by an Anisotropic Thermally Conductive Hexagonal Boron Nitride Coating," *Advanced Functional Materials*, 2020, 30: 1909196. (9 pages).
Hakansson et al., "Hydrodynamic alignment and assembly of nanofibrils resulting in strong cellulose filaments," *Nature Communications*, 2014, 5:4018. (10 pages).
International Search Report and Written Opinion, mailed Jul. 30, 2018, in International Application No. PCT/US18/26742. (19 pages).
JP Office Action, issued Mar. 8, 2022 (Mar. 8, 2022), in Japanese Patent Application No. 2019-555858. (8 pages).
Li et al., "A radiative cooling structural material," *Science*, 2019, 364: pp. 760-763. (5 pages).
Li et al., "Anisotropic, lightweight, strong, and super thermally insulating nanowood with naturally aligned nanocellulose," *Sci. Adv.*, 2018, 4: eaar3724. (10 pages).
Li et al., "Strong and superhydrophobic wood with aligned cellulose nanofibers as a waterproof structural material," *Chinese Journal of Chemistry*, 2020, 38(8): pp. 823-829. (7 pages).
Li et al., "Wood Composite as an Energy Efficient Building Material: Guided Sunlight Transmittance and Effective Thermal Insulation," *Advanced Energy Materials*, 2016, 6: 1601122. (7 pages).
Notice of Allowance, issued May 28, 2021 (May 28, 2021), in parent U.S. Appl. No. 16/604,005. (7 pages).
Notice of Allowance, issued Aug. 9, 2021 (Aug. 9, 2021), in parent U.S. Appl. No. 16/604,005. (3 pages).
Notice of Allowance, issued Jul. 29, 2022 (Jul. 29, 2022), in parent U.S. Appl. No. 17/408,695. (9 pages).
Pelaez-Samaniego et al., "Abundance and characteristics of lignin liquid intermediates in wood (*Pinus ponderosa* Dougl. ex Laws.) during hot water extraction," *Biomass and Bioenergy*, Oct. 2015, 81: pp. 117-128. (12 pages).
Shams et al., "A new method for obtaining high strength phenol formaldehyde resin-impregnated wood composites at low pressing pressure," *Journal of Tropical Forest Science*, 2009, 21(2): pp. 175-180. (6 pages).
Shams et al., "Compressive deformation of wood impregnated with low molecular weight phenol formaldehyde (PF) resin III: Effects of sodium chlorite treatment," *Journal of Wood Science*, 2005, 51(3): pp. 234-238. (5 pages).
Solar et al., "Alkaline and alkaline/oxidation pre-treatments of spruce wood. Part 1: Chemical alterations of wood and its digestibility under conditions of Kraft cook," *Wood Research*, 2009, 54(4): pp. 1-12. (12 pages).

(56) References Cited

OTHER PUBLICATIONS

Song et al., "Processing bulk natural wood into a high-performance structural material," *Nature*, Feb. 2018, 554: pp. 224-228 (16 pages including supplementary information).
U.S. Office Action, issued Feb. 19, 2021 (Feb. 19, 2021), in parent U.S. Appl. No. 16/604,005. (6 pages).
U.S. Office Action, issued Jan. 6, 2022 (Jan. 6, 2022), in parent U.S. Appl. No. 17/408,695. (6 pages).
U.S. Office Action, issued Mar. 25, 2022 (Mar. 25, 2022), in parent U.S. Appl. No. 17/408,695. (6 pages).
Zhu et al., "Anisotropic, transparent films with aligned cellulose nanofibers," *Advanced Materials*, 2017, 29: 1606284 (8 pages).
Zhu et al., "Highly Anisotropic, Highly Transparent Wood Composites," *Advanced Materials*, 2016, 28: pp. 5181-57. (7 pages).
Zhu et al., "Wood-Derived Materials for Green Electronics, Biological Devices, and Energy Applications," *Chemical Reviews*, 2016, 116: pp. 9305-9374. (70 pages).
CN Office Action, issued Oct. 30, 2023 (Oct. 30, 2023), in Chinese Patent Application No. 202210805318.1. (22 pages).
KR Office Action, issued Oct. 17, 2023 (Oct. 17, 2023), in Korean Patent Application No. 10-2023-7028580. (13 pages).
CN Office Action, issued Mar. 30, 2023 (Mar. 30, 2023), in Chinese Patent Application No. 202210805318.1. (25 pages).
EP Office Action, issued Apr. 28, 2023 (Apr. 28, 2023), in European Patent Application No. 18783970.9. (8 pages).
EP Office Action, issued Jul. 30, 2024 (Jul. 30, 2024), in European Patent Application No. 24161497.3. (12 pages).
JP Office Action, issued Jun. 25, 2024 (Jun. 25, 2024), in Japanese Patent Application No. 2023-061589. (7 pages).
AU Office Action, issued Jan. 2, 2025 (Jan. 2, 2025), in Australian Patent Application No. 2023222935. (4 pages).
Appendix D5 to the EP Office Action, issued Jan. 22, 2025 (Jan. 22, 2025), in European Patent Application No. 18783970.9. (2 pages).
Appendix D21 to the EP Office Action, issued Jan. 22, 2025 (Jan. 22, 2025), in European Patent Application No. 18783970.9. (7 pages).
Carter, H. A., "The Chemistry of Paper Preservation. Part 2. The Yellowing of Paper and Conservation Bleaching," *Journal of Chemical Education*, Nov. 1996, 73(11): pp. 1068-1073. (6 pages).
EP Office Action, issued Jan. 22, 2025 (Jan. 22, 2025), in European Patent Application No. 18783970.9. (42 pages).
European Standard, Ref. No. EN 338:2009 (E), "Structural Timber—Strength Classes." Oct. 2009. (14 pages).
Fink et al., "Transparent Wood—A New Approach in the Functional Study of Wood Structure," *Holzforschung*, 1992. 46(5): pp. 403-408. (6 pages).
Gellerstedt et al., "The Reactions of Lignin with Alkaline Hydrogen Peroxide. Part III. The Oxidation of Conjugated Carbonyl Structures," *Acta Chemica Scandinavica B*, Jan. 1980, 34: pp. 275-280. (6 pages).
Gerhards, C.C., "Effect of Moisture Content and Temperature on the Mechanical Properties of Wood: An Analysis of Immediate Effects," *Wood and Fiber*, 1982, 14(1): pp. 4-36. (33 pages).
Jakob et al., "Effects of Fiber Angle on the Tensile Properties of Partially Delignified and Densified Wood," *Materials*, Nov. 2020, 13: 5405. (9 pages).
Jakob et al., "Preparation of High Strength Plywood from Partially Delignified Densified Wood," *Polymers*, Aug. 2020, 12: 1796. (13 pages).
Luce, Foster, "Delignified Impregnated Wood," *Mechanical Engineering*, Oct. 1944, 66(10): pp. 654-657. (4 pages).
Novaes et al., "Lignin and Biomass: A Negative Correlation for Wood Formation and Lignin Content in Trees," *Plant Physiology*, Oct. 2010, 154: pp. 555-561. (7 pages).
Ramos et al., "Bleaching with Hydrogen Peroxide. A Review," *Afinidad LXV*, Sep. 2008, 65(537): pp. 366-373. (8 pages).
Shams et al., "Compressive deformation of wood impregnated with low molecular weight phenol formaldehyde (PF) resin I: Effects of pressing pressure and pressure holding," *J. Wood Sci.*, 2004, 50: pp. 337-342. (6 pages).
Shi et al., "Effect of thermal treatment with water, H2SO4 and NaOH aqueous solution on color, cell wall and chemical structure of poplar wood," *Scientific Reports*, Dec. 2018, 8: 17735. (9 pages).
Sjostrom, E., *Wood Chemistry—Fundamentals and Applications, Second Edition*. Academic Press, Inc., San Diego, CA. 1993, pp. xi-293. TS932.S5813. (*298 pages*).
EP Office Action, issued Nov. 13, 2024 (Nov. 13, 2024), in European Patent Application No. 24161497.3. (12 pages).

\* cited by examiner

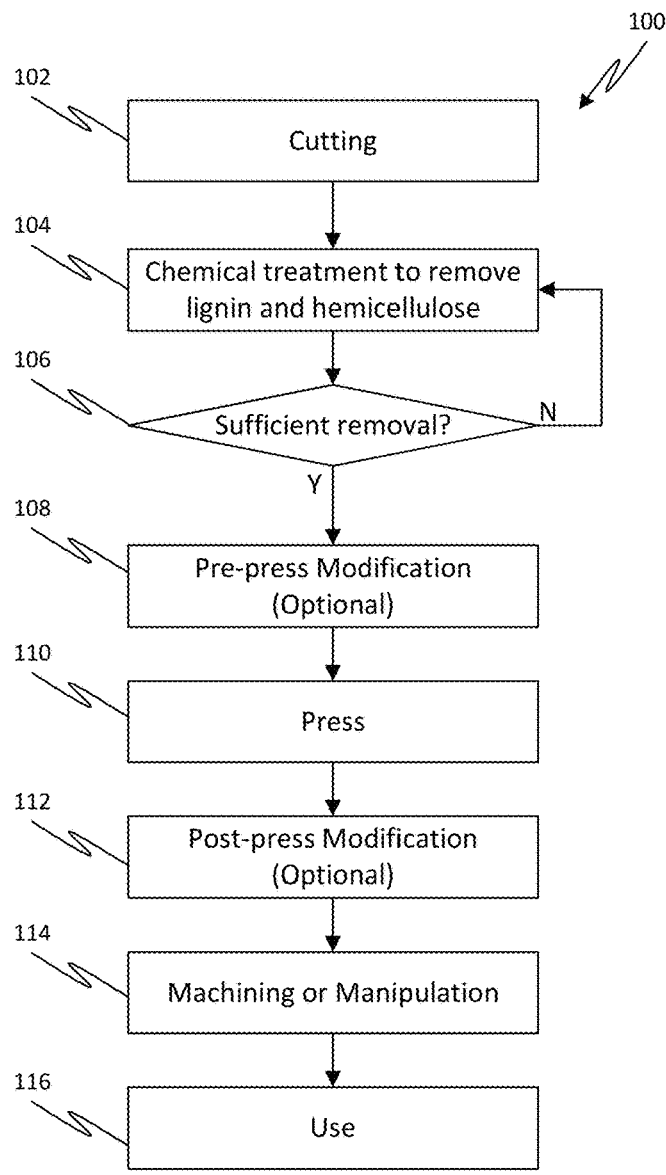
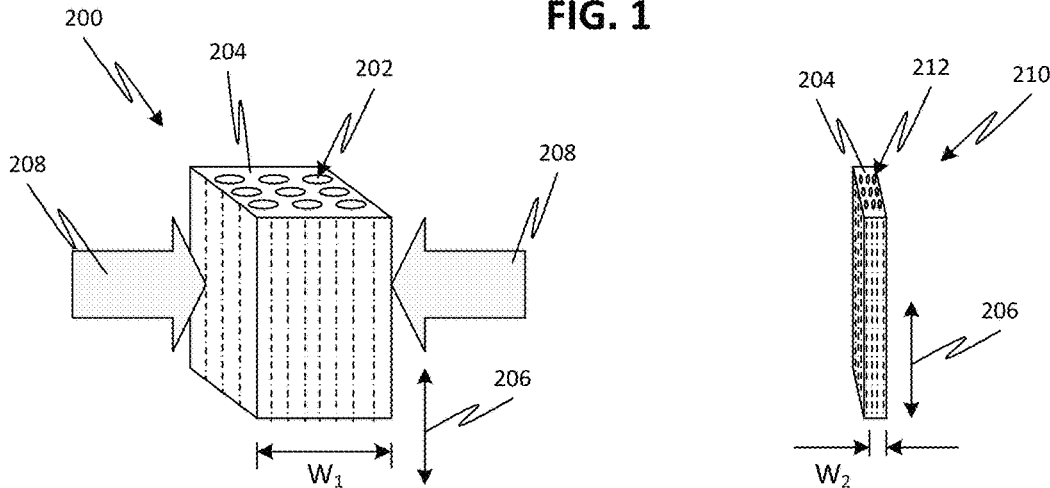
FIG. 1
FIG. 2A
FIG. 2B

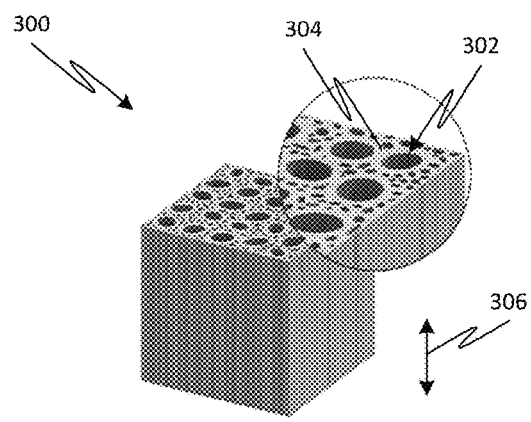
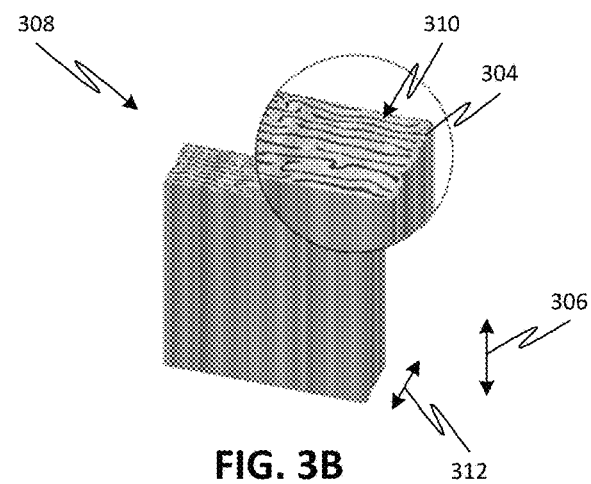
FIG. 3A
FIG. 3B
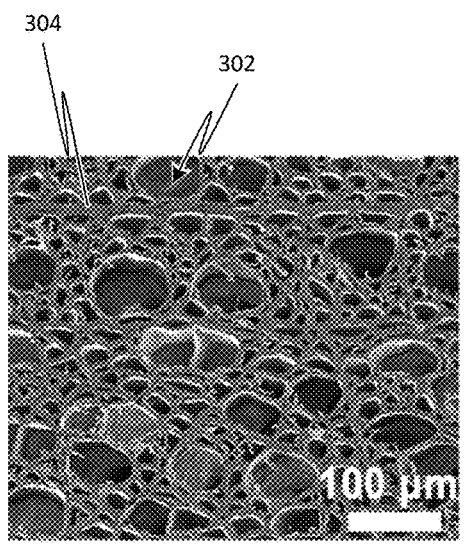
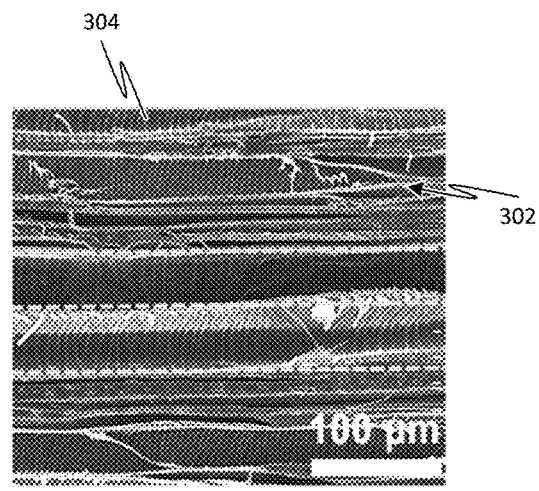
FIG. 3C
FIG. 3D
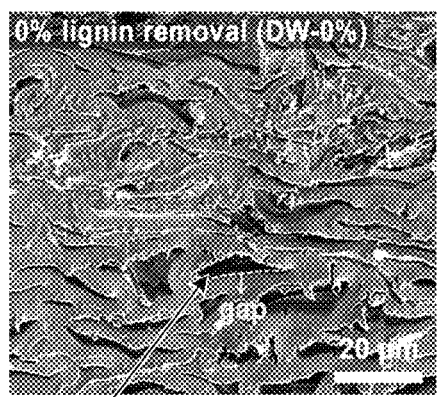
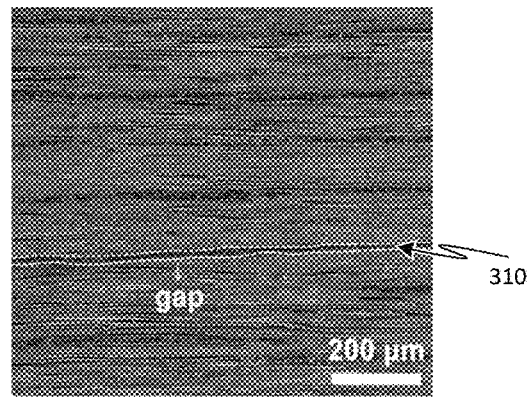
FIG. 3E
FIG. 3F

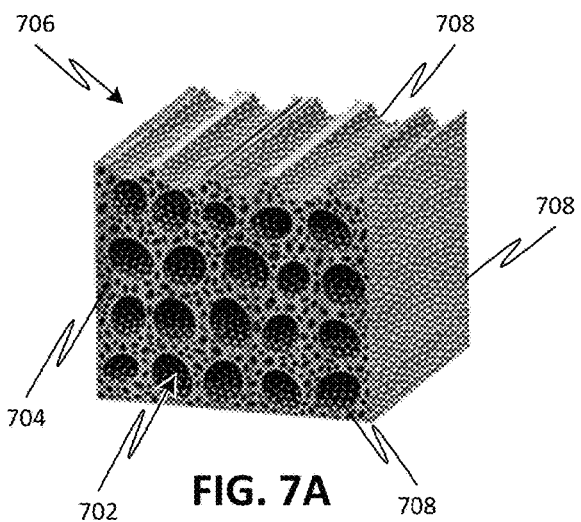
FIG. 7A
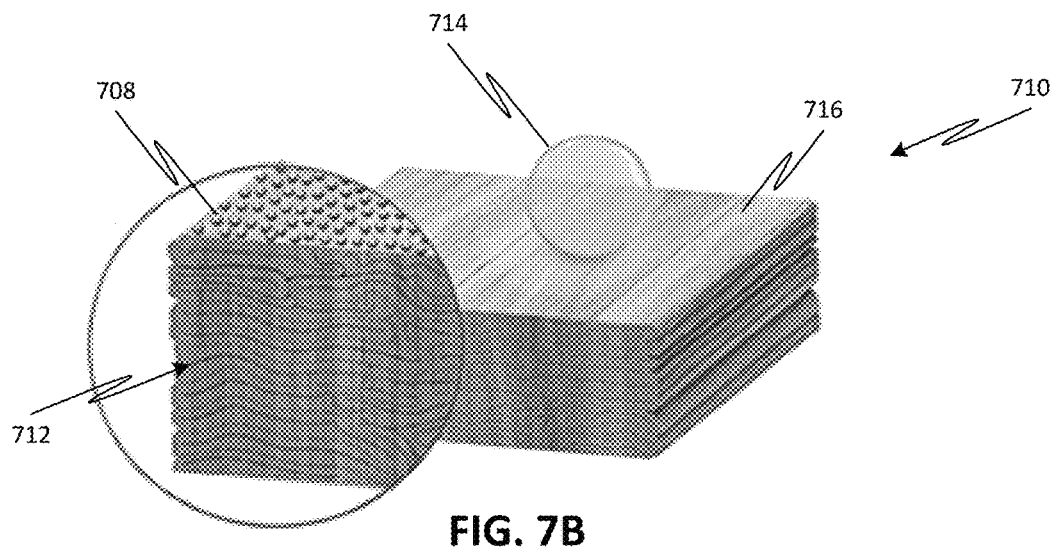
FIG. 7B
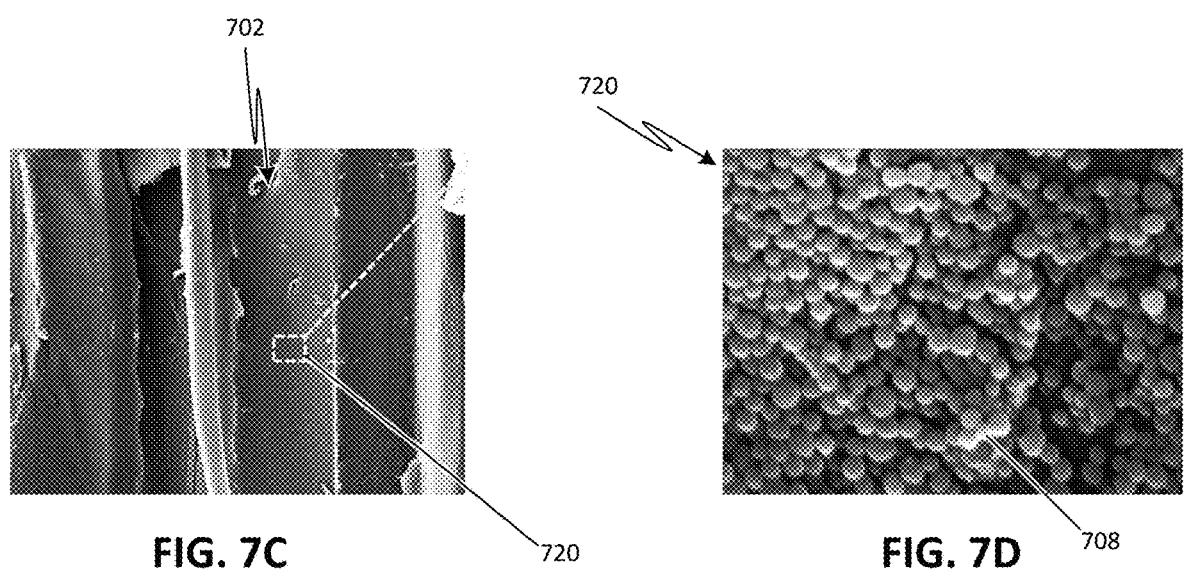
FIG. 7C  FIG. 7D

STRONG AND TOUGH STRUCTURAL WOOD MATERIALS, AND METHODS FOR FABRICATING AND USE THEREOF

CROSS-REFERENCE TO RELATED APPLICATIONS

The present application is a continuation of U.S. application Ser. No. 17/408,695, filed Aug. 23, 2021, now U.S. Pat. No. 11,554,514, which is a continuation of U.S. application Ser. No. 16/604,005, filed Oct. 9, 2019, now U.S. Pat. No. 11,130,256, which is a U.S. National Stage of International Application No. PCT/US2018/026742, filed Apr. 9, 2018, which claims the benefit of U.S. Provisional Application Nos. 62/483,828, filed Apr. 10, 2017, and 62/627,600, filed Feb. 7, 2018, each of which is hereby incorporated by reference herein in its entirety.

FIELD

The present disclosure relates generally to natural wood structures, and more particularly, to chemical treatment and pressing of natural wood to have increased strength and toughness, as well as structures and devices incorporating such strong and tough wood materials.

SUMMARY

Embodiments of the disclosed subject matter provide a strong and tough wood structure formed by subjecting cellulose-based natural wood material to a chemical treatment that partially removes lignin therefrom. The treated wood retains lumina of the natural wood, with cellulose nanofibers of cell walls being aligned. The treated wood is then pressed in a direction crossing the direction in which the lumina extend (i.e., having a force component perpendicular to the direction in which the lumina extend), such that the lumina collapse and any residual fluid within the wood is removed. As a result, the cell walls become entangled and hydrogen bonds are formed between adjacent cellulose nanofibers, thereby improving the strength and toughness of the wood among other mechanical properties. By further modifying, manipulating, or machining the pressed, chemically treated wood, it can be adapted to various structural applications.

In one or more embodiments, a structure comprises a first piece of natural wood that has been chemically treated to partially remove lignin therein while substantially preserving a structure of cellulose-based lumina and that has been further subjected to pressing in a first direction crossing a direction of extension of the lumina such that the lumina at least partially collapse.

In one or more embodiments, a method comprises treating a piece of natural wood with a chemical solution so as to partially remove lignin therein while substantially preserving a structure of cellulose-based lumina, the lumina extending in a first direction. The method can also comprise, after the treating, pressing the piece of chemically-treated wood in a second direction crossing the first direction for a first time such that the lumina at least partially collapse.

In one or more embodiments, a structure comprises a piece of densified wood where lumina therein are completely collapsed without any gaps between cell walls of the lumina in a cross-sectional view.

In one or more embodiments, a laminate comprises a plurality of pieces of densified wood. Each piece can have at least partially collapsed lumina in cross-sectional view. The lumina extending in a respective extension direction. The extension directions of at least some of the pieces of densified wood can intersect with each other. The plurality of pieces of densified wood in the laminate can be coupled together.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIG. 1 is an exemplary process flow diagram for fabricating strong and tough wood-based structures, according to one or more embodiments of the disclosed subject matter FIG. 2A is a simplified schematic illustration of a piece of natural wood subjected to a chemical treatment to partially remove lignin therefrom, according to one or more embodiments of the disclosed subject matter.

FIG. 2B is a simplified schematic illustration of the chemically treated wood of FIG. 2A after pressing, according to one or more embodiments of the disclosed subject matter.

FIG. 3A is a simplified illustration of a piece of natural wood without any lignin removal.

FIG. 3B is a simplified illustration of the natural wood of FIG. 3A after pressing.

FIG. 3C is a scanning electron microscopy (SEM) image of a cross-section, in a direction perpendicular to a tree growth direction, of the natural wood without any lignin removal.

FIG. 3D is an SEM image of a longitudinal section, in a direction parallel to a tree growth direction, of the natural wood without any lignin removal.

FIG. 3E is an SEM image of a cross-section, in a direction perpendicular to the tree growth direction, of the natural wood after pressing.

FIG. 3F is an SEM image of a longitudinal section, in a direction parallel to the tree growth direction, of the natural wood after pressing.

FIG. 4A is a simplified illustration of a piece of natural wood subjected to a chemical treatment to partially remove lignin therefrom, according to one or more embodiments of the disclosed subject matter.

FIG. 4B is a simplified illustration of the chemically treated wood of FIG. 4A after pressing, according to one or more embodiments of the disclosed subject matter.

FIG. 4C is an SEM image of a cross-section, in a direction perpendicular to the tree growth direction, of the chemically treated wood after pressing, according to one or more embodiments of the disclosed subject matter.

FIG. 4D is an SEM image of a longitudinal section, in a direction parallel to the tree growth direction, of the chemically treated wood after pressing, according to one or more embodiments of the disclosed subject matter.

FIG. 7A is a simplified illustration of chemically treated wood with a plurality of nanoparticles on surfaces thereof, according to one or more embodiments of the disclosed subject matter.

FIG. 7B is a simplified illustration of the wood of FIG. 7C after pressing, according to one or more embodiments of the disclosed subject matter.

FIG. 7C is an SEM image of inner surfaces of lumina of the chemically treated wood with nanoparticles, before pressing, according to one or more embodiments of the disclosed subject matter.

FIG. 7D is a magnified SEM image of region 720 of FIG. 7C, according to one or more embodiments of the disclosed subject matter.

DETAILED DESCRIPTION

Figure 4E:
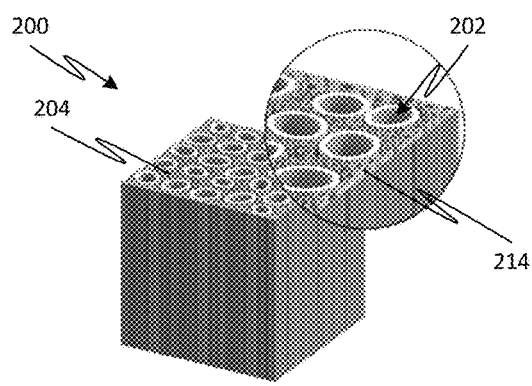
FIG. 4E is a magnified SEM image of region 410 of FIG. 4D, according to one or more embodiments of the disclosed subject matter.
Figure 4E:
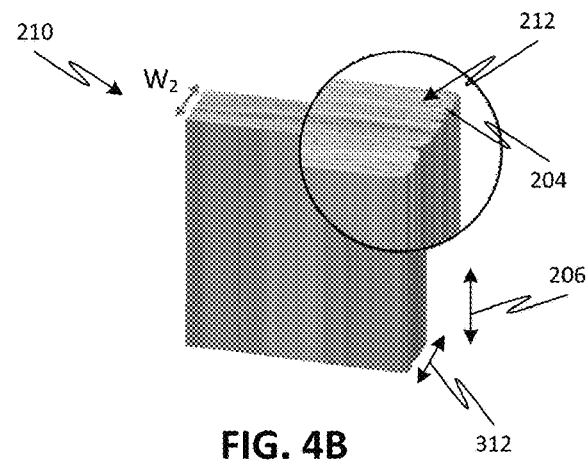
Figure 4E:
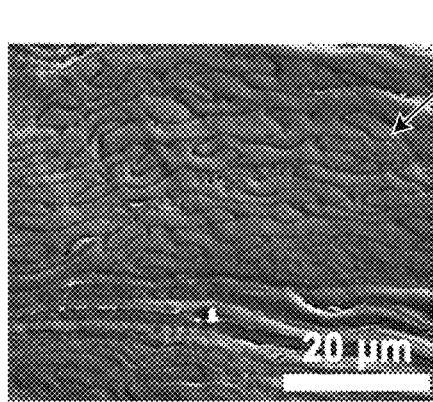
Figure 4E:
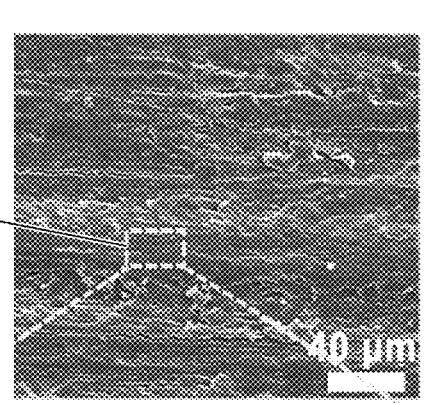
Figure 4E:
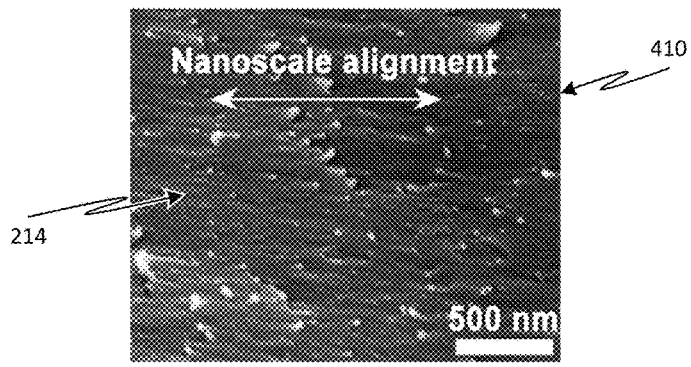

Natural wood is a composite of cellulose nanofibers embedded in a matrix of lignin (20%~35% by weight) and hemicellulose (20%~30% by weight). Cellulose, the major component in wood (40%~50% by weight), has a specific modulus and a specific strength higher than most metals, composites, and many ceramics. Natural wood also has a unique three-dimensional porous structure 300 with multiple channels, including lumina 302 (e.g., tubular channels of 20-80 μm in cross-sectional dimension) extending in a direction 306 of wood growth, as illustrated in FIG. 3A. Cell walls 304 in the natural wood 300 are mainly composed of the cellulose, hemicellulose, and lignin, with the three components intertwining with each other to form a strong and rigid wall structure, as illustrated in the SEM images of FIGS. 3C and 3D.

In embodiments of the disclosed subject matter, natural wood is subjected to a chemical treatment. The chemical treatment leads to significant reduction of lignin and hemicellulose content in natural wood, but only a modest reduction of cellulose content. By partial removal of lignin/hemicellulose from the cell walls 304, the wood becomes more porous and less rigid. After the chemical treatment, the wood is subjected to pressing in a direction perpendicular to a direction in which the cellulose-based structure extends (i.e., in a direction in which the tree grew and in which the lumina of the natural wood extend). The pressed, chemically treated wood (i.e., densified wood) can enjoy at least improved strength and toughness as compared to the natural wood prior to the treatment and pressing. Moreover, additional materials can be added to the wood, either before pressing or after pressing, in order to form a hybrid structure. The added materials can add functionality not otherwise available with the natural wood, for example, by providing hydrophobicity or fire resistance, while enjoying the improved mechanical performance offered by the densified wood after the chemical treatment and pressing.

As used herein, densified wood is intended to refer to natural wood (or other naturally occurring fibrous plants, such as bamboo) that has been subjected to the chemical treatment and pressing processes described herein, which chemical processes partially remove lignin and hemicellulose and which pressing processes at least partially collapse (preferably fully collapse) the lumina of the chemically treated wood, thereby improving the mechanical properties of the wood. The terms piece and structure are used interchangeably herein and refer to a particular sheet, stick, strip, bar, block, membrane, film, or any other shape. Indeed, in some instances, the pressed, chemically treated wood structure with collapsed lumina is simply referred to as densified wood or strong wood. In some embodiments, a densified wood film may be considered thin, i.e., having a thickness less than either dimension in a plane perpendicular to the thickness direction, for example, less than 200 μm in thickness after pressing.

Referring initially to FIG. 1, a generalized process 100 for forming and using densified wood is shown. The process 100 can begin at 102, where a piece of natural wood is supplied, for example, by cutting from an existing tree (or other plant) or block of natural wood. For example, FIG. 3A illustrates a piece of natural wood 300 that has been cut to a rectangular shape, although other starting shapes are also possible, such as but not limited to, cylindrical or hollow cylindrical shapes. The natural wood 300 exhibits a unique three-dimensional structure with lumina 302 that extend along a tree growth direction 306. The lumina 302 are bounded by cell walls 304, which are primarily composed of cellulose. FIGS. 3C and 3E are scanning electron microscopy (SEM) images showing the morphology and microstructure of the natural wood 300.

The natural wood can be any type of hard wood or softwood, such as, but not limited to, basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew. In some embodiments, the natural wood can be a naturally occurring fibrous plant other than a tree, such as bamboo.

After the cutting 102, the process 100 proceeds to 104 where the piece of natural wood 300 can be subjected to treatment with a chemical solution in order to partially (but not fully) remove lignin therefrom. The treatment 104 can be performed under vacuum, so as to encourage the chemical solution to fully penetrate the cell walls and lumina of the natural wood. The treatment can be such that between 1% and 99% (weight percent) of the lignin in the original natural wood is removed, while retaining at least some of the cellulose of the natural wood. For example, at least 20%, at least 40%, at least 60%, or at least 90% (weight percent) of the cellulose from the natural wood is retained after the chemical treatment, while between 5% and 95% of the lignin in the natural wood is removed. In some embodiments, between 23% and 60% of the lignin in the natural wood. For example, 55% of the lignin from the natural wood (i.e., 45% removal) can be retained after the chemical treatment.

The chemical solution can include chemicals used in pulping or pulp bleaching and can include at least one of NaOH, NaOH/$Na_2S$, $NaHSO_3$+$SO_2$+$H_2O$, $NaHSO_3$, $NaHSO_3$+$Na_2SO_3$, NaOH+$Na_2SO_3$, $Na_2SO_3$, NaOH+AQ, NaOH/$Na_2S$+AQ, $NaHSO_3$+$SO_2$+$H_2O$+AQ, NaOH+$Na_2SO_3$+AQ, $NaHSO_3$+AQ, $NaHSO_3$+$Na_2SO_3$+AQ, $Na_2SO_3$+AQ, NaOH+$Na_2S$+$Na_2S_n$, $Na_2SO_3$+NaOH+$CH_3OH$+AQ, $CH_3OH$, $C_2H_5OH$, $C_2H_5OH$+NaOH, $C_4H_9OH$, HCOOH, $CH_3COOH$, $CH_3OH$+HCOOH, $C_4H_8O_2$, $NH_3 \cdot H_2O$, p-TsOH, $H_2O_2$, NaClO, $NaClO_2$+acetic acid, $ClO_2$, and $Cl_2$, where n in an integer and AQ is Anthraquinone.

At 106, it is determined if sufficient lignin has been removed from the natural wood. As noted above, between 1% and 99% of the lignin is removed, with the ultimate amount being dependent on the desired mechanical properties of the densified wood for a particular application. The amount of lignin removed is dependent on the immersion time, which may range from as little as 0.1 hours to over 72 hours, for example, 0.5 hours to 1 hour. Depending on the desired amount of lignin removal, the temperature of the chemical solution may also be adjusted in addition to or in place of adjusting the time of immersion. In some embodiments, the chemical solution may be boiling, which may effect a greater amount of lignin as compared to non-boiling solutions. In some embodiments, the chemical solution may have an alkaline pH value. For example, the chemical solution can be a boiling solution of 2.5 M NaOH and 0.4 M $Na_2SO_3$ and the immersion time can be 0.5-7 hours.

Once sufficient lignin has been removed by the treatment of 104, the process 100 can proceed to optionally rinsing the treated piece of wood. The rinsing can include immersing the treated piece of wood in a solvent, such as, but not limited to, de-ionized (DI) water. In some embodiments, the solvent may be at an elevated temperature, such as boiling. The rinsing can be effective to remove any remnants of the chemical solution within the treated piece of wood and/or any components of the wood dislodged by the treatment. In some embodiments, it may be desirable to retain the dislodged components of the wood, in which case the rinsing can be omitted.

After rinsing (or after conclusion of treatment 104 when there is no rinsing), the process 100 can optionally proceed to 108, where the chemically treated wood is subjected to a pre-pressing modification. For example, the optional modification 108 can include forming or depositing non-native particles on surfaces of the chemically treated wood. Such surfaces can include internal surfaces, e.g., cell walls lining the lumina, as well as external surfaces of the chemically treated wood. The non-native particles incorporated onto the surfaces of the chemically treated wood can imbue the ultimate densified wood with certain advantageous properties, such as hydrophobicity, weatherability, corrosion resistance (e.g., salt water resistant), and/or flame resistance among other properties. For example, in an embodiment, hydrophobic nanoparticles (e.g., $SiO_2$ nanoparticles) can be formed on surfaces of the chemically treated wood, as further described below with respect to FIGS. 7A-7E.

Alternatively or additionally, the optional modification 108 can include adding a polymer to the chemically treated wood or performing a further chemical treatment that modifies surfaces of the chemically treated wood to obtain the advantageous properties. For example, the further chemical treatment of 108 to provide hydrophobic properties can include at least one of epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, trimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

For example, the further chemical treatment of 108 to provide weatherability or corrosion resistance can include at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolinate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13} \cdot 4H_2O$.

After the optional modification 108, the process 100 can proceed to 110, where the chemically treated wood is pressed in a direction crossing a direction in which the lumina extend. For example, the pressing 110 can be in a direction substantially perpendicular to the direction in which the lumina extend, or the pressing 110 may have a force component perpendicular to the direction in which the lumina extend. The pressing 110 can reduce a thickness of the wood, thereby increasing its density, as well as removing any voids or gaps within the cross-section of the wood. For example, the pressing 110 can be at a pressure between 0.5 MPa and 10 MPa, e.g., 5 MPa. In some embodiments the pressing may be performed at room temperature (i.e., cold pressing), while in other embodiments the pressing may be performed at an elevated temperature (i.e., hot pressing). For example, the pressing may be performed at a temperature between 20° C. and 120° C., e.g., 100° C.

The pressing 110 may be performed after the treatment 104 and/or any optional modification 108 without an intermediate drying step. As a result, the chemically treated wood may retain water therein. The pressing 110 can thus remove any water retained with the chemically-treated wood as well as reducing a thickness and increasing density of the wood. During the pressing 110, hydrogen bonds can form between the remaining cellulose-based nanofibers of the cell walls of the wood, thereby improving mechanical properties of the wood. Moreover, any particles or materials formed on surfaces of the wood or within the wood during modification 108 can be retained after the pressing, with the particles/materials on internal surfaces being embedded within the collapsed lumina and intertwined cell walls.

The pressing 110 can be performed for a period of time to allow water to be removed and the desirable hydrogen bonds to form. For example, chemically treated wood can be held under pressure for a time period of at least 5 minutes, although other times are possible depending on factors such as temperature, relative humidity, and type of wood. For example, the chemically treated wood can be held under pressure for at least 1 hour, at least 12 hours, at least 24 hours, or at least 48 hours.

FIG. 2A illustrates a chemically treated wood block 200 with lumina 202 extending along direction 206 and walls 204 comprised of cellulose based nanofibers aligned along direction 206. The block 200 can be subjected to pressing 208 in a direction crossing the extension direction 206, thereby resulting in the densified wood structure 210 of FIG. 2B. As a result of the pressing, the lumina 202 can fully collapse, as indicated at 212, and the cell walls 204 can become intertwined. The pressing can be such that a thickness $W_2$ of the block 210 after pressing is reduced by at least 10% as compared to $W_1$ of the block 200. For example, the thickness $W_2$ may be reduced by greater than 60%, 70%, or 80%, as compared to $W_1$ of the block 200. For example, the pressing can result in a compression ratio ($W_1:W_2$) of 1.1:1 to 10:1

After pressing 110, the process can optionally proceed to 112, where the now densified wood is subjected to a post-pressing modification. For example, the optional modification 112 can include forming or depositing a coating (e.g., of non-native particles) on exterior surfaces of the densified wood. The coating can imbue the densified wood with certain advantageous properties, hydrophobicity, weatherability, corrosion resistance (e.g., salt water resistant), and/or flame resistance among other properties. For example, the coating can comprise an oil-based paint, a hydrophobic paint, a polymer coating, or a fire-resistant coating.

Figure 6A:
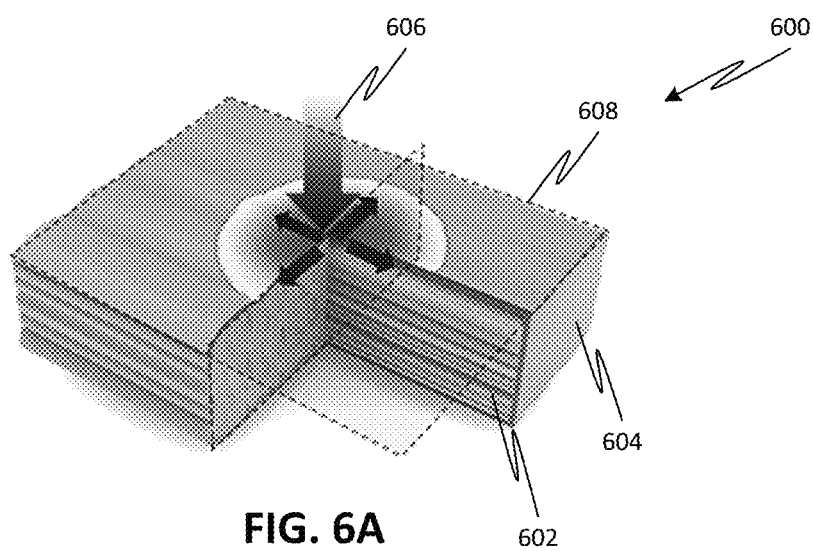
FIG. 6A is a simplified illustration of a coated piece of pressed, chemically treated wood, according to one or more embodiments of the disclosed subject matter.
Figure 6B:
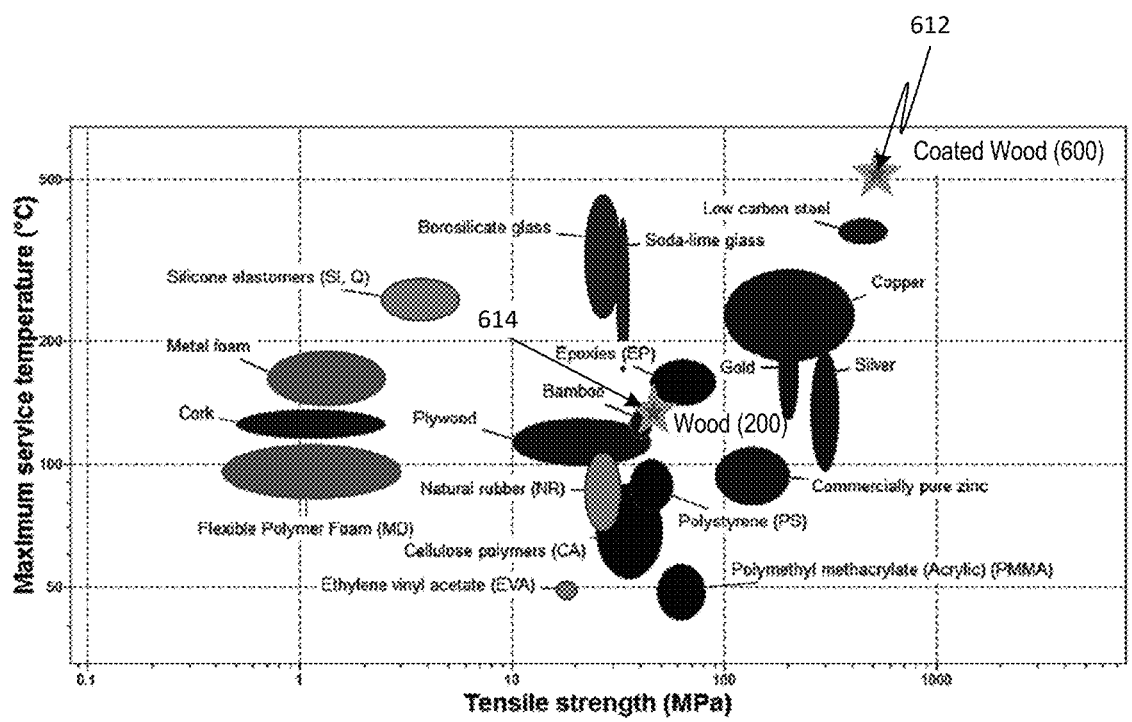
FIG. 6B is a graph of maximum service temperature versus tensile strength for various structural materials.

In an embodiment, a fire-resistant coating of nanoparticles (e.g., BN nanoparticles) can be formed on exterior surfaces of the densified wood, as further described below with respect to FIGS. 6A-6B. Alternatively or additionally, the coating of modification 112 can include at least one of boron nitride, montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide.

After the optional modification 112, the process 100 can optionally proceed to 114, where the densified wood can be prepared for an eventual use, for example, by machining or manipulating to alter a structure or shape of the densified wood. Machining processes can include, but are not limited to, cutting (e.g., sawing), drilling, woodturning, tapping, boring, carving, routing, sanding, grinding, and abrasive tumbling. Manipulating process can include, but are not limited to, bending, molding, and other shaping techniques.

After the optional machining or manipulation 114, the process 100 can proceed to 116, where the densified wood can be used in a particular application. Because of the improved mechanical properties, the densified wood can find application in a wide variety of structures and uses. For example, the densified wood can be adapted for as:

an exterior component (e.g., body panel, door panel, roof, bumper, flooring, roof, trim, mast, etc.), an internal structural component (e.g., chassis, frame rails, crossbeam, fuselage frame, wing frame, etc.), or an interior component (e.g., door panel, liner, handle, railing, flooring, seat, trim, storage bin or shelf, etc.) of an automobile, truck, motorcycle, train, aircraft, watercraft, spacecraft, ship or any other transport, vehicle, or conveyance;

an exterior component (e.g., external wall, siding, roofing, shutters, etc.), an internal structural component (e.g., frame, studs, wall plates, lintels, crossbeams, load bearing beam, underfloor, etc.), or an interior component (e.g., door, door frame, window frame, picture frame, wall, flooring, paneling, ceiling, trim, stairs, railing, etc.) of a home, office, barn factory, warehouse, tower, or any other building or structure;

a structural component of a deck, awning, dock, patio, bridge, pole, bleachers, or platform;

furniture (e.g., chair, bench, desk, table, cabinet, wardrobe, countertop, etc.) or internal structural components thereof (e.g., frame for sofa or chair, bedframe, etc.), or home accent or decoration;

musical instrument (e.g., piano, guitar, violin, harp, zither, drum, etc.), sports equipment (e.g., golf clubs, table tennis table and paddle, basketball backboard, goal or goalpost, baseball bat, etc.), tool (e.g., hammer handle, broom handle, sawhorse, etc.); or protective component (e.g., computer case, cell phone case, blast shield, protective vest, etc.), enclosure, container, box, shipping crate, packaging, or housing.

The above list of uses for the densified wood is not intended to be exhaustive. Applications of the densified wood beyond those specifically listed are also possible according to one or more contemplated embodiments. Indeed, one of ordinary skill in the art will readily appreciate that the densified wood can be adapted to other applications based on the teachings of the present disclosure.

In conventional densification processes, the natural wood 300 is pressed without otherwise removing lignin therefrom. In many cases, pre-treatment (e.g., exposure to steam, heat, or ammonia, or cold rolling) of the wood is necessary. While these pre-treatments can soften the wood structure, they do not change the underlying composition of the natural wood. The resulting pressed wood 308, illustrated in FIG. 3B, is limited in the amount of thickness reduction (i.e., along direction 312) as compared to the original natural wood. For example, conventional densification processes are limited to about a 60% reduction in thickness. Without lignin removal, it is difficult to press the natural wood 300 so as to completely collapse lumina 302 and remove any other voids from the cross-section. Moreover, partial recovery of thickness of the pressed wood 308 can occur after pressing. The conventional densified wood 308 without lignin removal thus suffers from numerous gaps 310 between collapsed cell walls 304, as illustrated in FIG. 3B and the SEM images of FIGS. 3E-3F.

In contrast, the densified wood with partial lignin removal, according to embodiments of the disclosed subject matter, can completely collapse lumina in the natural wood and remove the open spaces between cells walls, resulting in a unique laminated structure with cell walls tightly intertwined with each other that can yield superior mechanical properties. For example, by pressing wood 200, which has been chemically treated to partially remove lignin therefrom, the wood lumina 202 and the porous cell walls 204 collapse entirely, as shown in FIG. 4B. Due to the partial removal of lignin, the pressing is able to achieve an increased reduction in thickness, for example, at least a 5:2 reduction (e.g., between 70% and 80% reduction) in thickness, as well as an increased density (e.g., about 3 times increase).

As shown in the SEM images of FIGS. 4C-4D, the previously hollow lumina 202 are completely collapsed to form highly intertwined wood cell walls. Even the tiny pits in the wood cell walls 204 are eliminated due to densification. The densified wood 210 has a unique microstructure, with the fully collapsed wood cell walls being tightly intertwined along their cross-section and densely packed along their length direction (i.e., direction 206). Moreover, as illustrated in FIG. 4E, the cellulose nanofibers 214 of the cell walls 204 remain highly aligned (e.g., along direction 206), similar to natural wood but much more densely packed.

Figure 4F:
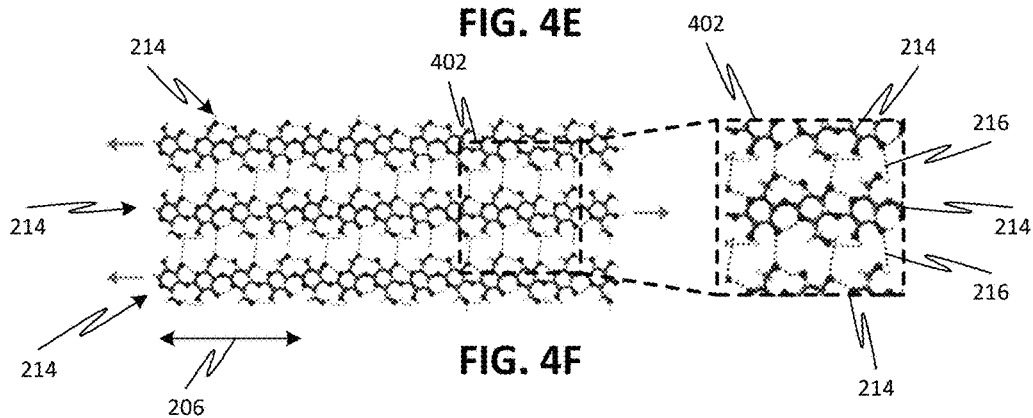
FIG. 4F is a schematic illustrating hydrogen bonding between cellulose nanofibers of the entangled cell walls of the chemically treated wood after pressing, according to one or more embodiments of the disclosed subject matter.

Due to the chemical treatment and subsequent pressing, hydrogen bonds 216 are formed between neighboring cellulose nanofibers 214, as illustrated in FIG. 4F. These hydrogen bonds 216 can positively contributed to the enhancement of mechanical properties of the densified wood. In particular, the densely packed and intertwined wood cell walls 204 in the densified wood 210 at micro-scale lead to a high degree of alignment of cellulose nanofibers 214 and thus drastically increase the interfacial area among nanofibers 214.

Due to the rich hydroxyl groups in cellulose molecular chains, the relative sliding among densely packed wood cell walls 204 involves an enormous number of repeating events of hydrogen bond formation-breaking-reformation at the molecular scale. Consequently, the total energy needed to fracture the densified wood is significantly higher than that to fracture natural wood. In other words, the densified wood is much tougher than natural wood. The densely packed microstructure also drastically reduces both the quantity and size of defects in the densified wood, thus leading to a much higher strength than natural wood. Exemplary values for mechanical properties of natural wood and densified wood (e.g., basswood with 45% lignin removal) are given below in Table 1.

The mechanical properties of the densified wood are not only superior to those of natural wood, but also exceed those of many widely used structural materials (e.g., plastics, steel and alloys). Indeed, the demonstrated tensile strength for the densified wood is much higher than that of typical plastics (e.g., nylon 6, polycarbonate, polystyrene, and epoxy) as well as conventional densified wood that does not remove lignin therefrom. Interestingly, the significant increase in tensile strength of the densified wood does not suffer from a decrease in toughness. The intrinsic lightweight nature of cellulose also results in a specific strength for the densified wood of at least 300 MPa cm$^3$/g, for example, about 450 MPa cm$^3$/g, which specific strength exceeds that for titanium alloy (e.g., about 244 MPa cm$^3$/g).

TABLE 1

Comparison of mechanical properties for natural wood and densified wood

| Mechanical Property | Natural Wood | Densified Wood | Change |
| --- | --- | --- | --- |
| Tensile Strength (MPa) | 46.7 | 548.8 | >10x increase |
| Elastic Stiffness (GPa) | 4.8 | 51.6 | >10x increase |
| Scratch Hardness (GPa) | 0.02 | 0.6 | 30x increase |
| Impact Toughness (J/cm$^2$) | 1.38 | 11.41 | >8x increase |
| Fracture Toughness (MJ/m$^3$) | 0.4 | 4 | 10x increase |
| Hardness Modulus (lbs/in) | 740.1 | 9454.5 | >10x increase |
| Flexural Strength (MPa) (along growth direction) | 54.3 | 336.8 | >5x increase |

TABLE 1-continued

Comparison of mechanical properties
for natural wood and densified wood

| Mechanical Property | Natural Wood | Densified Wood | Change |
|---|---|---|---|
| Flexural Strength (MPa) (orthogonal to growth dir.) | 4.4 | 79.5 | >15x increase |
| Compressive Strength (MPa) (along growth direction) | 29.6 | 163.6 | >5x increase |
| Compressive Strength (MPa) (orthogonal to growth dir.) | 2.6 | 87.6 | >30x increase |

Table 2 compares axial compressive strengths (along the direction of lumina extension) of natural wood, delignified wood without hot-pressing (sample 1), pressed natural wood without delignification (sample 2), and densified wood (delignified and then pressed—sample 3). As is apparent, at least partial removal of lignin is necessary to ensure full collapse of the lumina and to intertwine the cell walls, which allow the resulting densified wood to achieve superior strength and toughness.

TABLE 2

Comparison of axial compressive strength
for different processed wood materials

| | Partial Lignin Removal | Pressing | Axial Compressive Strength (MPa) |
|---|---|---|---|
| Natural Wood | No | No | 29.6 |
| Sample 1 | Yes | No | 22.8 |
| Sample 2 | No | Yes | 75.9 |
| Sample 3 | Yes | Yes | 163.6 |

Figure 5A:
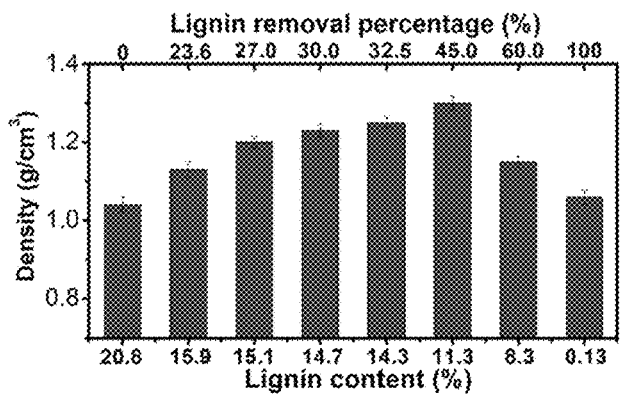
FIG. 5A is a graph of resulting density values for pressed, chemically treated wood as a function of lignin content, according to one or more embodiments of the disclosed subject matter.
Figure 5B:
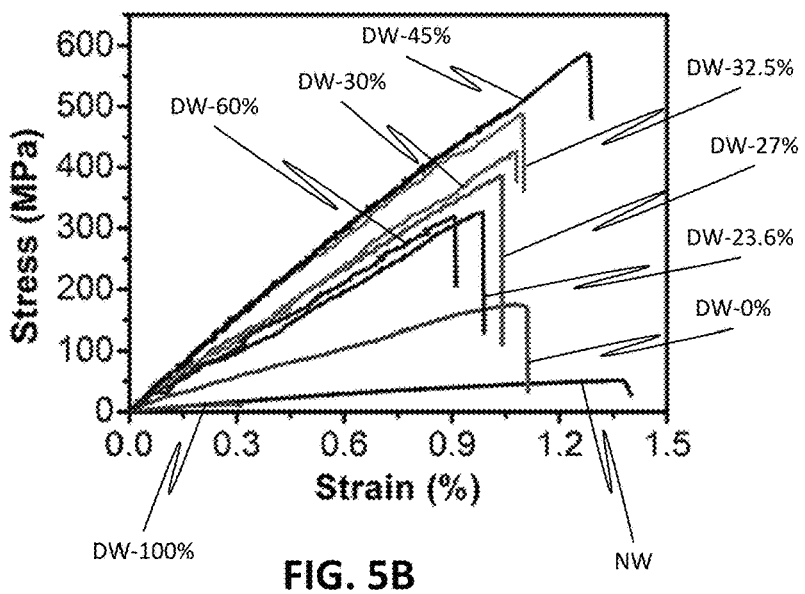
FIG. 5B is a graph of stress-strain curves for pressed, chemically treated wood for different lignin content, according to one or more embodiments of the disclosed subject matter.

However, the mechanical properties of the resulting densified wood are also dependent on how much lignin is removed from the natural wood prior to pressing. The amount of lignin removal can be a function of time within the chemical solution, as reflected in the data of Table 3. FIG. 5B illustrates stress-strain curves of densified wood samples with different levels of lignin removal and for a natural wood sample without pressing. Table 3 provides composition and mechanical properties for the densified wood samples with different levels of lignin removal and for the natural wood sample without pressing. In FIGS. 5A-5B, as well as Table 3, NW refers to natural wood without any pressing, DW-x refers to densified wood with x being the removal percentage of lignin. As is readily apparent from the data, densified wood with 45% lignin removal (e.g., lignin content 11.3 wt %) has the highest strength and toughness for basswood, although other removal amounts may be optimal for other types of wood or for different applications.

TABLE 3

Composition and mechanical properties for densified wood with different lignin removal

| Sample Name | Time (hr) | Chemical Solution | Cellulose (wt %) | Hemicellulose (wt %) | Lignin (wt %) | Strength (MPa) | Work of fracture (MJ/m$^3$) | Density (g/cm$^3$) |
|---|---|---|---|---|---|---|---|---|
| NW | 0 | None | 44.01 | 19.5 | 20.8 | 51.6 | 0.43 | 0.46 |
| DW-0% | 0 | None | 44.01 | 19.5 | 20.8 | 175.0 | 1.1 | 1.04 |
| DW-23.6% | 0.5 | NaOH + Na$_2$SO$_3$ | 42.2 | 10.6 | 15.9 | 325.6 | 1.6 | 1.13 |
| DW-27% | 1 | NaOH + Na$_2$SO$_3$ | 40.2 | 9.2 | 15.1 | 386.3 | 2.1 | 1.20 |
| DW-30% | 3 | NaOH + Na$_2$SO$_3$ | 38.2 | 7.2 | 14.7 | 425.6 | 2.3 | 1.23 |
| DW-32.5% | 5 | NaOH + Na$_2$SO$_3$ | 38.1 | 6.8 | 14.3 | 488.8 | 2.9 | 1.25 |
| DW-45% | 7 | NaOH + Na$_2$SO$_3$ | 38.7 | 5.2 | 11.3 | 586.8 | 4.0 | 1.30 |
| DW-60% | 8.5 | NaOH + Na$_2$SO$_3$ + H$_2$O$_2$ | 35.4 | 3.8 | 8.2 | 319.0 | 1.48 | 1.15 |
| DW-100% | 11 | NaOH + Na$_2$SO$_3$ + H$_2$O$_2$ | 31.2 | 1.89 | 0.13 | 12.5 | 0.02 | 1.06 |

Figure 5C:
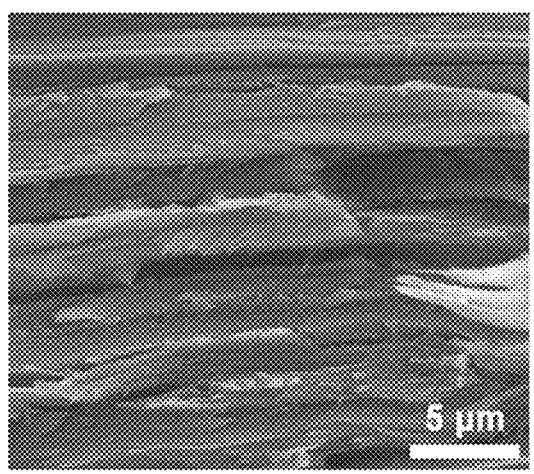
FIG. 5C is an SEM image of a longitudinal section, in a direction parallel to the tree growth direction, of pressed wood after chemical treatment to remove all lignin.

The density of the resulting densified wood is also a function of the amount of lignin removed, as reflected in the graph of FIG. 5A. When the lignin removal percentage is below 45%, the density of the resulting densified wood increases with lignin removal percentage. This can be attributed to at least three factors. First, more pores are created in the cell walls as more lignin is removed. Second, the cell walls of the chemically treated wood become softer with increasing time in the chemical solution, which increased time is necessary to effect the desired increase in lignin removal. Third, the structure after chemical treatment does not collapse as it retains at least some lignin as a binder agent. However, if too much lignin is removed (e.g., if ~100% of lignin is removed), then the wood structure easily collapses under pressure, as illustrated by the SEM image of FIG. 5C, thus inhibiting the ability to increase the density of the structure by pressing.

TABLE 4

Comparison of mechanical properties for different species of wood

| Species of Wood | Type | Tensile Strength (MPa) | Work of Fracture (MJ/m$^3$) |
|---|---|---|---|
| Basswood | Natural | 51.6 | 0.43 |
| | Densified | 586.8 | 4.0 |
| Oak | Natural | 115.3 | 1.84 |
| | Densified | 584.3 | 5.3 |
| Poplar | Natural | 55.6 | 0.48 |
| | Densified | 431.5 | 3.0 |
| Cedar | Natural | 46.5 | 0.35 |
| | Densified | 550.1 | 3.3 |
| Pine | Natural | 70.2 | 0.58 |
| | Densified | 536.9 | 3.03 |

Although the results for a particular species of wood are discussed herein and shown in Tables 1-3 and FIGS. 5A-5B, similar results can be obtained for other species of wood or other plants (e.g., bamboo). For example, Table 4 presents exemplary values for mechanical properties of different species of natural wood and densified wood (with partial lignin removal). Accordingly, the teachings of the present disclosure are applicable to a wide variety of plant species.

The densified wood can also be stable under attack by moisture. For example, when subjected to 95% relative humidity (RH) for 128 hours, the densified wood swells by about 8.4% in thickness and demonstrates a modest drop (e.g., less than 20%) in tensile strength to 493.1 MPa, which is still an order of magnitude greater than the tensile strength of natural wood in an ambient environment.

Further protection of the properties of the densified wood from environmental factors or introduction of new properties can be provided by post-pressing modification 112. For example, the densified wood can be rendered substantially immune from environmental moisture by coating with an oil-based paint, a hydrophobic paint, or a polymer coating. In another example, the densified wood 602 may have a heat-resistant coating 604 formed on exterior surfaces 608 thereof, as illustrated in FIG. 6A. Such a coating 604 may enable the composite structure 600 to conduct heat 606 along surface 608 and thereby minimize, or at least reduce, a temperature increase of an interior of the composite structure (i.e., the densified wood 602).

Coating 604 may act as a fire-retardant coating. In an embodiment, the fire-retardant coating 604 may be a boron nitride (BN) coating, such as a BN nanosheet (e.g., a layer of nanoparticles coupled to the surface of the densified wood 602). Such a composite structure 600 can enjoy superior performance with respect to at least tensile strength and maximum service temperature (612 in FIG. 6B) as compared to uncoated densified wood 200 (614 in FIG. 6B) or other conventional structural materials. Although shown as a single point 612, the critical temperature of the densified wood may range between 300° C. and 500° C., at a tensile strength of 600 MPa. In another embodiment, the fire-retardant coating comprises montmorillonite clay. Alternatively or additionally, the densified wood can be subjected to different surface treatments after processing, for example, to increase the hydrophobicity, weathering or corrosion resistance, chemical resistance, or fire-resistance, as noted above with respect to FIG. 1.

Alternatively or additionally, protection of the properties of the densified wood from environmental factors or introduction of new properties can be provide by pre-pressing modification 108. For example, functional materials, such as nanoparticles or a polymer, can be added to the chemically treated wood by a further chemical treatment to connote water resistance, corrosion resistance, weather resistance, chemical resistance, fire resistance, and/or other properties to the ultimate densified wood.

In an embodiment, nanoparticles can be formed on internal and external surfaces of the chemically treated wood so as to provide the densified wood with superhydrophobicity. As used herein, superhydrophobicity is defined as a static water contact angle (CA) greater than 150° and a dynamic rolling angle less than 10°. Such superhydrophobicity can improve the corrosion resistance of structural materials in moisture conditions, thus leading to improved stability and durability. In other embodiments, the nanoparticles may introduce hydrophobicity such that the densified wood exhibits a static contact angle of at least 90° or a dynamic contact angle less than 10°. For example, the nanoparticles can be SiO$_2$ nanoparticles.

As with other embodiments described above, the chemically treated wood is formed by first partially removing hemicellulose and lignin, leaving behind porous cell walls 704 and lumina 702. The chemically treated wood 700 is then subjected to a further chemical treatment that causes in-situ growth of the nanoparticles 708 on interior and exterior surfaces of the wood 706, as shown in FIG. 7A. For example, the chemically treated wood 700 can be immersed in a solution of tetraethyl orthosilicate (TEOS) and heptadecafluoro-1,1,2,2-tetradecyl trimethoxysilane (17F) (e.g., 3 ml of TEOS, 3 ml of NH$_3$·H$_2$O and 0.01 mL of 17F in 100 ml of ethanol). The immersion may be at an elevated temperature (e.g., 50° C.) and for an extended period of time (e.g., 10 hrs) to allow modified SiO$_2$ nanoparticles to form via the sol-gel method. For example, the nanoparticles can have a diameter of ~100 nm. As a result of the in-situ formation, the nanoparticles 708 can be homogenously distributed both on the wood surface and inside the lumina 702, as shown in the SEM images of FIGS. 7C-7D.

The treated wood 706 decorated with SiO$_2$ nanoparticles 708 can then be compressed (e.g., by pressing at 100° C.), resulting in a densified wood structure 710 shown in FIG. 7B. The pressing causes the spaces between the channel walls 704 to be eliminated (or almost entirely eliminated), resulting in a laminated structure with multiple intertwined layers 712 and aligned cellulose nanofibers inside individual layers. Despite the pressing, the SiO$_2$ nanoparticles are preserved between the intertwined layers. Thus, the well-preserved micro/nano hierarchical structure along with the in-situ growth of SiO$_2$ nanoparticles can impart superhydrophobicity to the densified wood 710. For example, the densified wood 710 can demonstrate static and dynamic contact angles of 159.4° and 3°, respectively, with respect to a water droplet 714 disposed on a surface 716 of the wood 710. The nanoparticles 708 can also impart resistance to acidic/alkaline conditions.

The superhydrophobicity can also provide the densified wood with anti-swelling properties. In particular, the densified wood 710 absorbs very little water when immersed in water for 24 hours, with an extremely low swelling efficiency of about 1.8%. This suggests that the densified wood 710 strongly repels water. In contrast, natural wood exhibits substantial swelling when exposed to the same conditions, e.g., demonstrating a swelling efficiency of 119%. The excellent hydrophobicity of densified wood 710 can remarkably improve wood's dimensional stability and decay resistance, even when exposed to wet conditions or otherwise unfavorable or hostile outdoor environments.

In addition, the nanoparticle treatment within the wood microstructure of the densified wood 710 can enhance the abrasion resistance of the treatment. In an experiment, sandpaper (120 mesh) was placed on top and bottom wood surfaces (the tangential section) during compression, leading to micrometer-sized roughness of the resulted densified wood 710. The initial static and dynamic contact angles of water on the densified wood are 159.2° and 3°, respectively. After 10, 20, 30, and 40 sandpaper abrasion cycles, values of 158.1°/4.5°, 156.3°/5.9°, 152.9°/7.7°, and 150.1°/9°, respectively, were obtained. As there is only minimal decrease of the static contact angle (and minimal increase of the dynamic contact angle) with each cycle, it is apparent that the hydrophobic treatment of the densified wood 710 is resistant to abrasion. The layered structure after compression confines the well-dispersed nano-$SiO_2$ spheres, which results in firm fastening of the nanoparticles onto the wood and thus the robust superhydrophobicity.

Figure 8A:
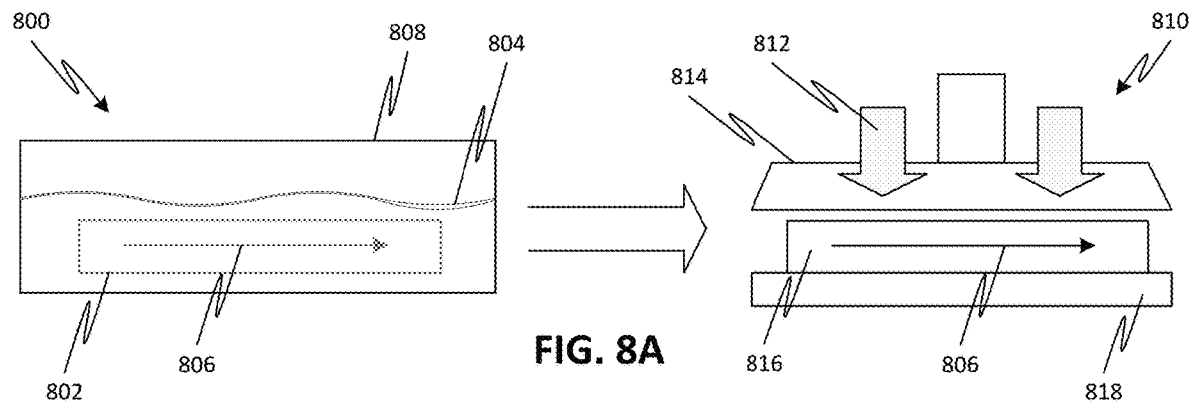
FIG. 8A is a simplified schematic illustration of an exemplary process for forming strong and tough wood, according to one or more embodiments of the disclosed subject matter.

Referring now to FIG. 8A, an exemplary fabrication process for forming a densified wood structure from natural wood 802 is shown. The natural wood 802 may be in the form of a sheet, stick, strip, bar, block, membrane, film, or any other shape of wood. Lumina within the natural wood 802 can extend along direction 806. The first step 800 in the fabrication process can be immersing the natural wood 802 within a chemical solution 804, for example, as described above with respect to 104 of process 100, to partially remove lignin from the wood 802. The chemical solution 804, and the wood 802 immersed therein, may be contained within a housing 808. In some embodiments, the housing 808 may be a vacuum housing and may maintain the solution 804 and wood 802 under vacuum during the immersion. Alternatively or additionally, the housing 808 or another component therein can heat the solution 804 above room temperature. For example, the solution 804 may be heated to boiling during the chemical treatment 800.

After the treatment 800, the chemically treated wood 816 may be conveyed from housing 808 to a compression station 810 for pressing in a direction substantially perpendicular to, or at least crossing, the direction of extension 806, for example, as described above with respect to 110 of process 100. For example, the compression station 810 can include an upper platen 814 and a lower platen 818. Relative motion between the platens 814, 818 results in the desired compression of chemically treated wood 816 to produce the densified wood. For example, upper platen 814 may move toward lower platen 818, which remains stationary and supports the wood 816 thereon, in order to impart a compression force 812 to the wood 816. Alternatively, both platens 814 and 818 may move toward each other to impart the compression force 812.

In some embodiments, during the compression, one or both platens 814, 818 can be heated so as to raise a temperature of the wood 816 above room temperature. Alternatively or additionally, the platens 814, 818 may be unheated but a separate heating mechanism may be provided or an environment containing the compression station may be heated in order to raise a temperature of the wood 816.

Figure 8B:
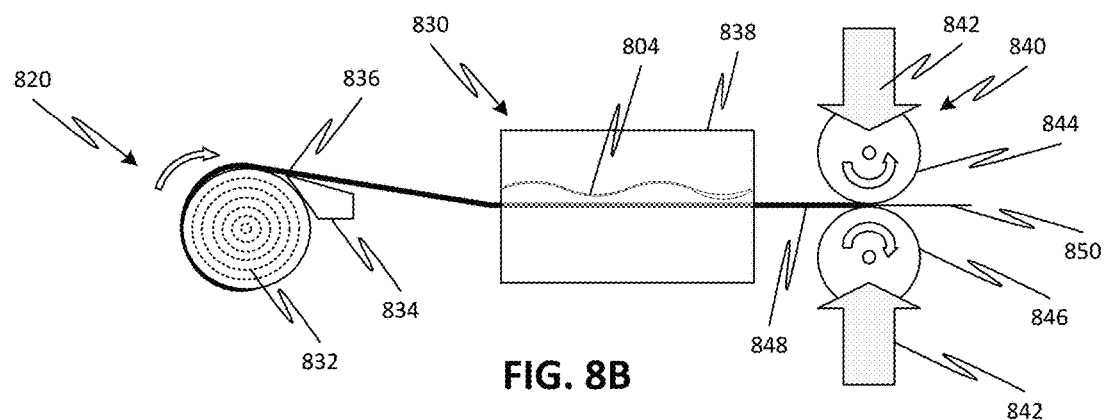
FIG. 8B is a simplified schematic illustration of an exemplary process for forming strong and tough wood using rotary cutting, according to one or more embodiments of the disclosed subject matter.

Referring to FIG. 8B, another exemplary fabrication process for forming a densified wood structure from natural wood 832 is shown. The natural wood 832 may be in the form of a log or cylindrical bar, with lumina extending in a direction perpendicular to the page. The first step 820 can be cutting the natural wood 832 using a rotary lathe 834, for example, to separate a thin continuous layer 836 of natural wood for subsequent processing. The natural wood layer 836 can be conveyed to housing 838 for the next step 830 in the fabrication process, e.g., immersing the wood 836 within a chemical solution 804, for example, as described above with respect to 104 of process 100, to partially remove lignin from the wood 802. Similar to housing 808, housing 838 may be configured to apply a vacuum and/or heat during the immersion. In some embodiments, the size of the housing 838 and the speed of conveyance of the layer 836 from the natural wood 832 and through the housing 838 may correspond to the desired immersion time for the chemical treatment. Thus, a time from when a portion of the layer 836 enters housing 838 to when it leaves housing 838 for the compression station 840 would correspond to the immersion time for the desired amount of lignin removal.

After the treatment 830, the chemically treated wood 848 may be conveyed from housing 838 to compression station 840, for pressing in a direction substantially perpendicular to, or at least crossing, the direction of extension, for example, as described above with respect to 110 of process 100. For example, the compression station 840 can include an upper roller 844 and a lower roller 846, which may remain at a fixed distance from each other. The fixed distance may be less than a thickness of the chemically treated wood 848, thereby applying a pressing force 842 that results in the densified wood.

In some embodiments, during the compression, one or both rollers 844, 846 can be heated so as to raise a temperature of the wood 848 above room temperature. Alternatively or additionally, the rollers 844, 846 may be unheated but a separate heating mechanism may be provided or an environment containing the compression station 840 may be heated in order to raise a temperature of the wood 848.

Although only two rollers 844, 846 are shown in FIG. 8B, multiple rollers may be disposed in series along a direction of conveyance of the sheet 848. The sheet 848 can be maintained under pressure as it is conveyed between adjacent rollers, in order to provide a desired cumulative time of compression (e.g., on the order of minutes or hours). Alternatively or additionally, the size of the rollers 844, 846 and the speed of conveyance of the sheet 848 may correspond to the desired compression time. Thus, a time from when the sheet 848 is first compressed to when it exits the compression station 840 as the densified wood 850 would correspond to the desired pressing time. Of course, it also possible to decouple the compression station 840 from the chemical treatment 838, for example, by cutting the sheet 836 prior to or after chemical treatment 838. In such configurations, the compression station may take the form of rollers as illustrated in FIG. 8B or as flat platens as illustrated in FIG. 8A.

Figure 8C:
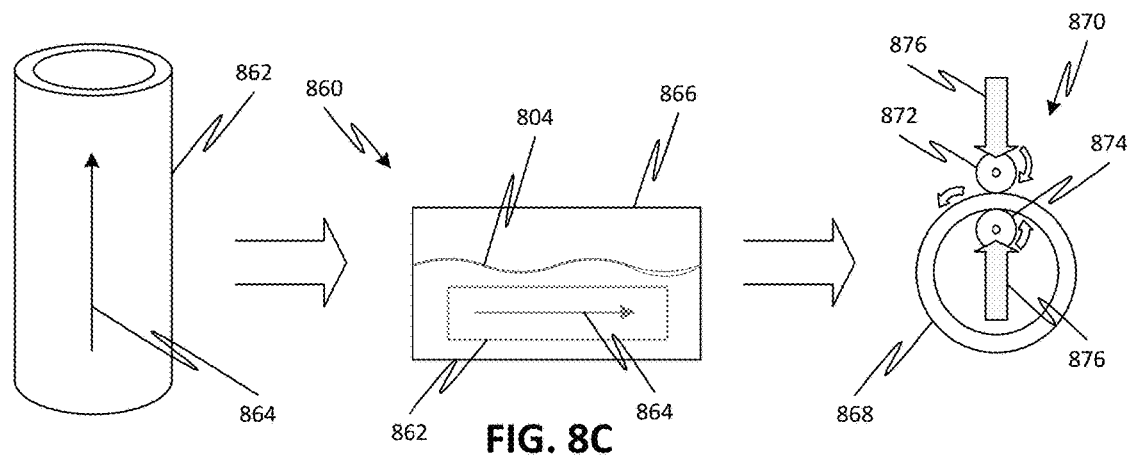
FIG. 8C is a simplified schematic illustration of an exemplary process for forming strong and tough wood from a hollow cylinder of natural wood, according to one or more embodiments of the disclosed subject matter.

Referring to FIG. 8C, an exemplary fabrication process for forming a densified wood structure from natural wood 862 is shown. The natural wood 862 may be in the form of a hollow cylinder, with lumina extending along direction 864. The first step 860 in the fabrication process can be immersing the natural wood 862 within a chemical solution 804, for example, as described above with respect to 104 of process 100, to partially remove lignin from the wood 862. The chemical solution 804, and the wood 862 immersed therein, may be contained within a housing 866, which may be configured to apply a vacuum and/or heat during the immersion similar to housing 808 of FIG. 8A.

After the treatment 860, the chemically treated wood cylinder 868 may be conveyed from housing 866 to a compression station 870 for pressing in a direction substantially perpendicular to, or at least crossing, the direction of extension 864 (which is perpendicular to the plane of the page at 870 in FIG. 8C), for example, as described above with respect to 110 of process 100. For example, the compression station 870 can include an upper roller 872 disposed on an exterior of the cylinder 868 and a lower roller 874 disposed within an interior of the cylinder 868. The rollers 872, 874 may remain at a fixed distance from each other as the wall of the cylinder 868 passes therethrough. The fixed distance may be less than a wall thickness of the chemically treated wood 868, thereby applying a pressing force 876 that results in a hollow cylinder of densified wood.

In some embodiments, during the compression, one or both rollers 872, 874 can be heated so as to raise a temperature of the wood 868 above room temperature. Alternatively or additionally, the rollers 872, 874 may be unheated but a separate heating mechanism may be provided or an environment containing the compression station 870 may be heated in order to raise a temperature of the wood 868.

Although only two rollers 872, 874 are shown in FIG. 8C, multiple rollers may be disposed in series around the circumference of the cylinder 868. The wall of the cylinder 868 can be maintained under pressure as it is conveyed between adjacent rollers, in order to provide a desired cumulative time of compression (e.g., on the order of minutes or hours). Alternatively or additionally, the size of the rollers 872, 874 and the speed of rotation of the cylinder 868 may correspond to the desired compression time.

Figure 8D:
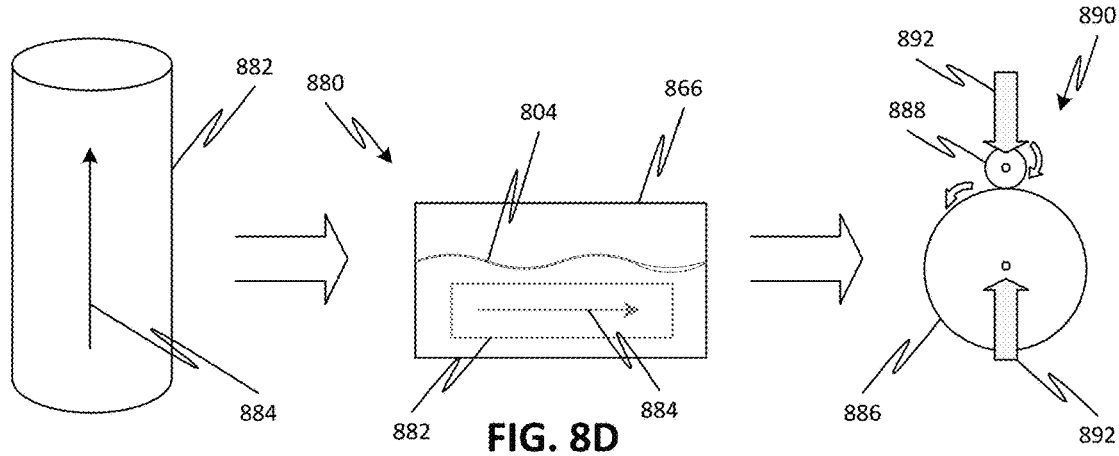
FIG. 8D is a simplified schematic illustration of an exemplary process for forming strong and tough wood from a solid cylinder of natural wood, according to one or more embodiments of the disclosed subject matter.

Referring to FIG. 8D, an exemplary fabrication process for forming a densified wood structure from natural wood 882 is shown. The natural wood 882 may be in the form of a solid cylinder, with lumina extending along direction 884. The first step 880 in the fabrication process can be immersing the natural wood 882 within a chemical solution 804, for example, as described above with respect to 104 of process 100, to partially remove lignin from the wood 882. The chemical solution 804, and the wood 882 immersed therein, may be contained within a housing 866, which may be configured to apply a vacuum and/or heat during the immersion similar to housing 808 of FIG. 8A.

After the treatment 880, the chemically treated wood cylinder 886 may be conveyed from housing 866 to a compression station 890 for pressing in a direction substantially perpendicular to, or at least crossing, the direction of extension 884 (which is perpendicular to the plane of the page at 890 in FIG. 8D), for example, as described above with respect to 110 of process 100. For example, the compression station 890 can include a single roller 888 disposed on an exterior of the cylinder 886, which can be supported and rotatable around a central axis thereof. The roller 888 may remain at a fixed distance that presses into the wall of the cylinder 886 as it rotates past, thereby applying a pressing force 892 that results in a solid cylinder of densified wood.

In some embodiments, during the compression, the roller 888 can be heated so as to raise a temperature of the wood 886 above room temperature. Alternatively or additionally, the roller 888 may be unheated but a separate heating mechanism may be provided or an environment containing the compression station 890 may be heated in order to raise a temperature of the wood 886.

Figure 8E:
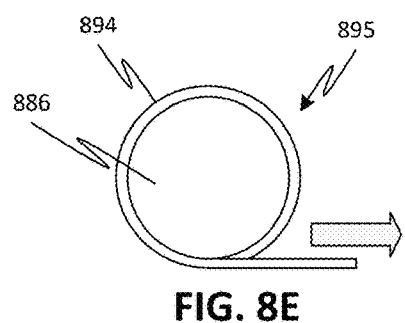
FIG. 8E is a simplified schematic illustration of another exemplary process for forming strong and tough wood from a solid cylinder of natural wood, according to one or more embodiments of the disclosed subject matter.

Although only a single roller 888 is shown in FIG. 8D, multiple rollers may be disposed in series around the circumference of the cylinder 886. The cylinder 886 can be maintained under pressure as it is conveyed between adjacent rollers, in order to provide a desired cumulative time of compression (e.g., on the order of minutes or hours). Alternatively or additionally, the size of the roller 888 and the speed of rotation of the cylinder 886 may correspond to the desired compression time. In yet another alternative, the cylinder 886 may be pressed by a compression belt 894 of compression station 895, as illustrated in FIG. 8E, instead of compression station 890 with roller 888. In such a configuration, the cylinder 886 may remain static rather than being rotated.

Although particular wood shapes and fabrication techniques have been illustrated in FIGS. 8A-8E, other shapes (whether solid or hollow) and fabrication techniques are also possible according to one or more contemplated embodiments. Accordingly, the wood shapes and fabrication techniques are not limited to those specifically illustrated. Moreover, although rinsing stations and pre-pressing and post-pressing modifications have not been illustrated in FIGS. 8A-8E, these techniques can be readily modified to include rinsing, pre-pressing modification and/or post-pressing modification according to one or more embodiments of the disclosed subject matter.

Figures 9A, 9B, 9C:
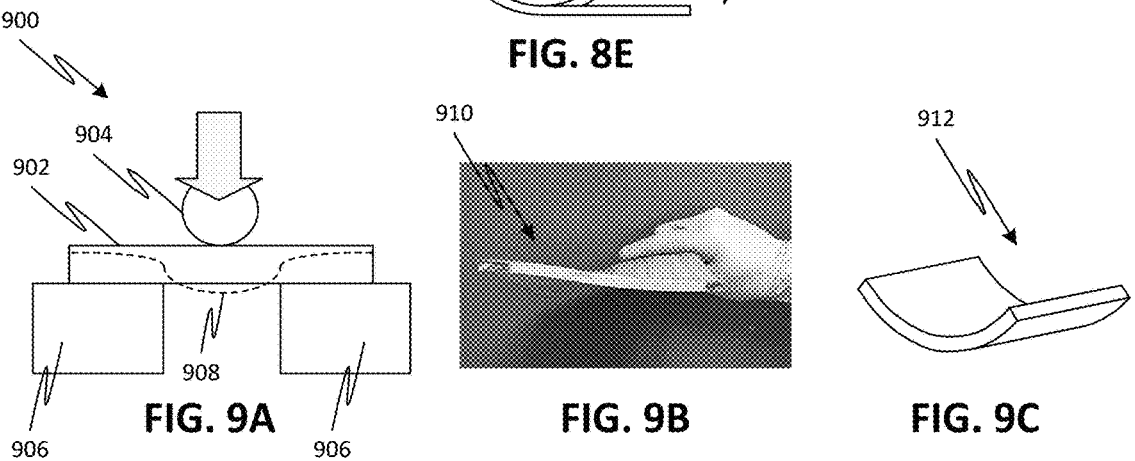
FIG. 9A is a simplified schematic illustration of a setup for bending the pressed, chemically treated wood, according to one or more embodiments of the disclosed subject matter.
FIG. 9B is an image of an exemplary bent piece of pressed, chemically treated wood, according to one or more embodiments of the disclosed subject matter.
FIG. 9C is a simplified schematic illustration of another exemplary bent piece of pressed, chemically, treated wood, according to one or more embodiments of the disclosed subject matter.
Figures 9D, 9E:
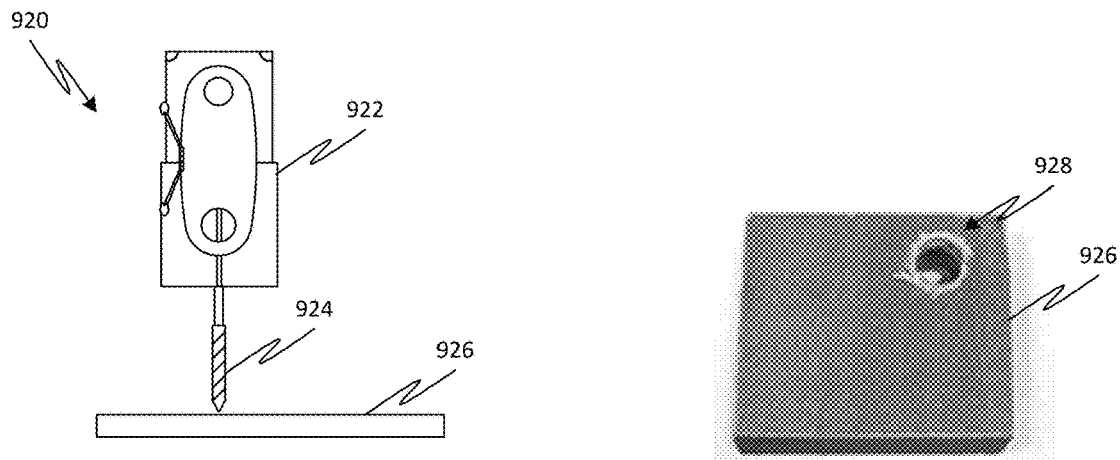
FIG. 9D is a simplified schematic illustration of a setup for machining the pressed, chemically treated wood, according to one or more embodiments of the disclosed subject matter.
FIG. 9E is an image of an exemplary machined piece of pressed, chemically treated wood, according to one or more embodiments of the disclosed subject matter.

Once a piece of chemically treated wood has been pressed to form the densified wood, it can be subject to further processing (i.e., machining or modification) in order to prepare it for its ultimate use, for example, as described above with respect to 114 of process 100. For example, the densified wood 902 can be installed in a bending setup 900, as illustrated in FIG. 9A. The densified wood 902 can rest on a support 906 while a bending tool 904 (e.g., cylindrical bar) is pressed in to an upper surface thereof. Maintaining the pressure via the bending tool 904 for a period of time can induce a desired curved profile 908 to the densified wood 902, for example the curved densified wood 910 of FIG. 9B or the curved densified wood 912 of FIG. 9C. Alternatively or additionally, the densified wood can be subjected to conventional machining techniques. For example, FIG. 9D illustrates a machining setup 920, where a press 922 with drill bit 924 is used to produce a through-hole 928 in a piece of densified wood 926, as shown in FIG. 9E. Other types of post-pressing modification and/or machining are also possible according to one or more contemplated embodiments.

In embodiments of the disclosed subject matter, the chemical treatment and pressing preserve the alignment of cellulose nanofibers of the natural wood, thus resulting in anisotropic mechanical properties of the densified wood. For example, tensile tests of the densified wood in the direction perpendicular to the fiber alignment direction yield a tensile strength of 45.1 MPa, which is much lower than the strength along the fiber alignment direction but still significantly higher than the strength in the lateral direction of natural wood (e.g., 5.7 MPa). To decrease the anisotropy (or to otherwise improve the mechanical properties), pieces of densified can be combined together in a laminate structure.

Figure 10A:
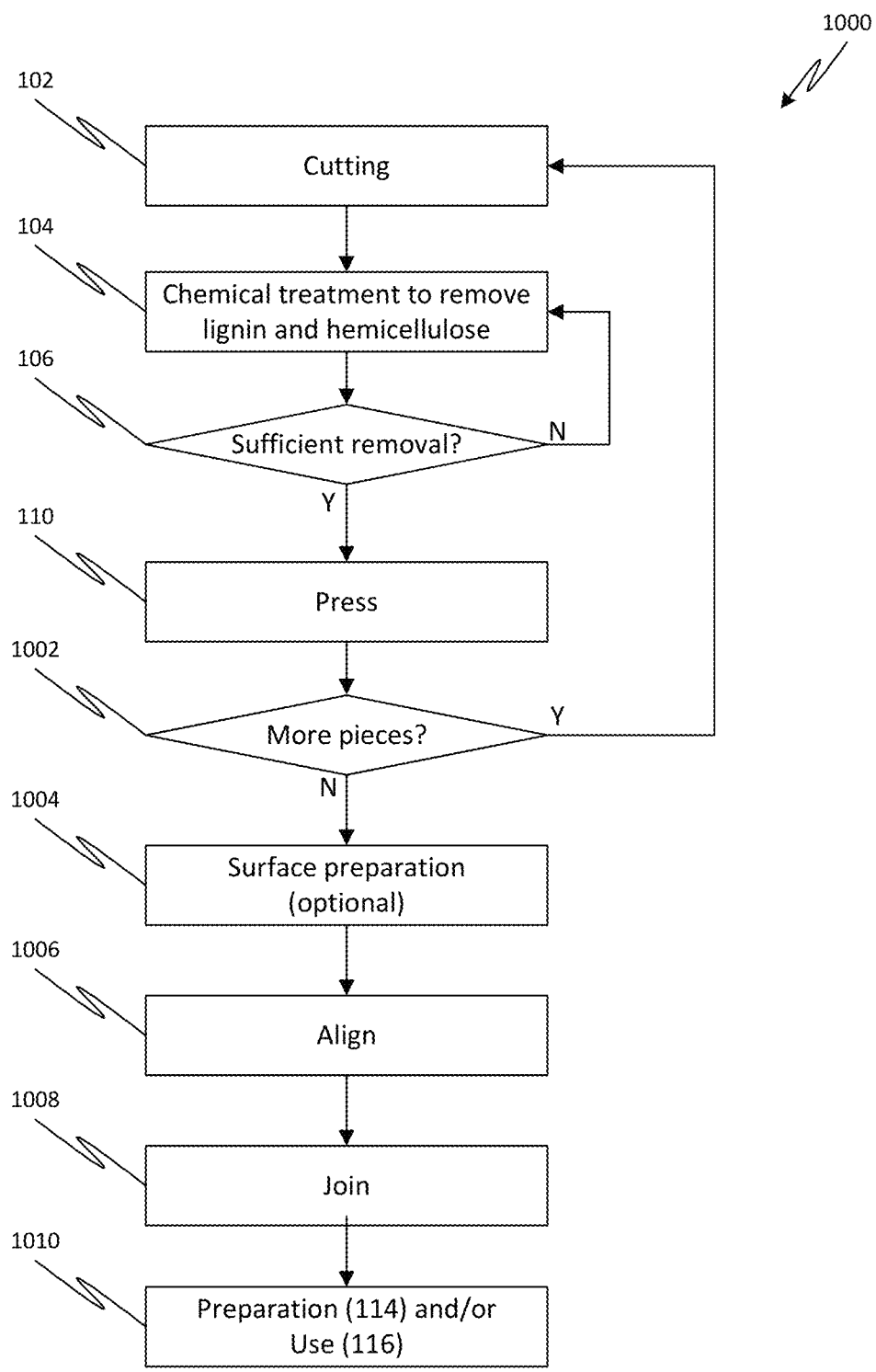
FIG. 10A is an exemplary process flow diagram for fabricating laminate structures from strong and tough wood, according to one or more embodiments of the disclosed subject matter.

Referring to FIG. 10A, a generalized process 1000 for forming and using a laminate structure of densified wood is shown. Similar to process 100 of FIG. 1, process 1000 can include cutting 102, chemical treatment 104 to remove sufficient lignin 106, and subsequent pressing 110 of the treated wood. These initial processes are repeated at 1002 to produce multiple separate pieces of densified wood.

Once a sufficient number of densified wood pieces have been prepared, the process 1000 can proceed to 1004, where the densified wood pieces are optionally subjected to a surface preparation. In some embodiments, pieces of densified wood are coupled together using a glue or epoxy. In such embodiments, the preparation 1004 may include applying the glue or epoxy to facing surfaces of the densified wood pieces. In other embodiments, eventual hydrogen bonding between facing surfaces of the densified wood pieces may be sufficient to hold them together, in which case the preparation 1004 may be omitted.

Figures 11A, 11B, 11C:
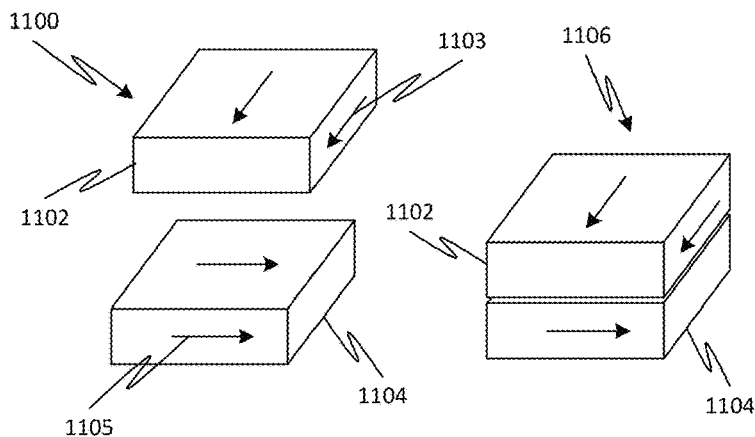
FIG. 11A is a simplified schematic of an arrangement of pieces of chemically treated wood for forming a laminate structure, according to one or more embodiments of the disclosed subject matter.
FIG. 11B is a simplified schematic of a laminate structure formed by the wood pieces of FIG. 11A, according to one or more embodiments of the disclosed subject matter.
FIG. 11C is a simplified schematic of a multi-layer laminate structure formed of chemically treated wood pieces of FIG. 11B, according to one or more embodiments of the disclosed subject matter.

The process 1000 can proceed to 1006, where the densified wood pieces are arranged in preparation for joining. Each of the densified wood pieces can have a respective orientation, which corresponds to the direction in which the lumina thereof extended prior to the pressing. The aligning 1006 can thus include arranging the densified wood pieces such that at least some of the wood pieces have different orientations with respect to each other. For example, FIG. 11A shows a set 1100 for a laminate, having a first piece 1102 of densified wood with a first orientation 1103 and a second piece 1104 of densified wood with a second orientation 1105. The first piece 1102 and the second piece 1104 can be arranged such that the first orientation 1103 is orthogonal to the second orientation 1105 once the pieces are joined as a laminate structure 1106, as shown in FIG. 11B.

Tensile strengths of the densified wood laminate of FIG. 11B along two perpendicular wood fiber directions can be substantially the same (e.g., 221.6±20 MPa and 225.6±18 MPa, respectively), and significantly higher than the T-direction strength (i.e., in a direction perpendicular to the wood fiber direction) of a single piece of densified wood (e.g. 43.3±2 MPa) or of natural wood (e.g., 5.1±0.4 MPa).

Figures 11D, 11E, 11F:
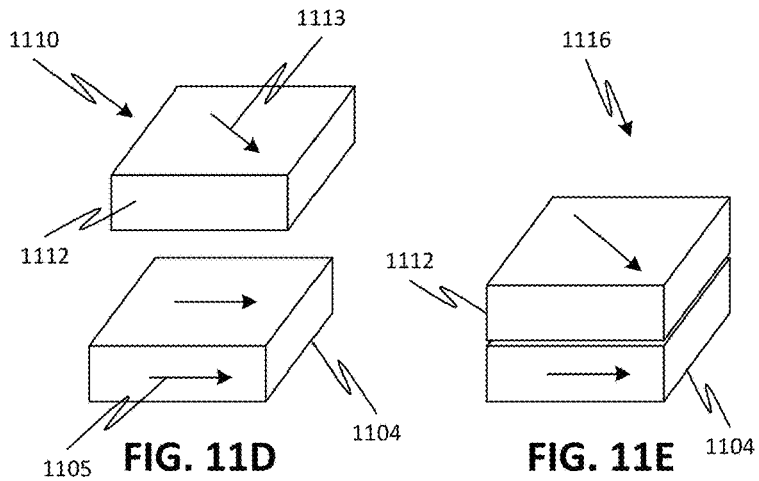
FIG. 11D is a simplified schematic of another arrangement of pieces of chemically treated wood for forming a laminate structure, according to one or more embodiments of the disclosed subject matter.
FIG. 11E is a simplified schematic of a laminate structure formed by the wood pieces of FIG. 11D, according to one or more embodiments of the disclosed subject matter.
FIG. 11F is a simplified schematic of a multi-layer laminate structure formed of chemically treated wood pieces of FIG. 11E, according to one or more embodiments of the disclosed subject matter.

In other embodiments, the orientations of coupled pieces of densified wood are at a non-orthogonal angle with respect to each other. For example, FIG. 11D shows another set 1110 for a laminate, where first piece 1112 of densified wood has a first orientation 1113 different from that of FIG. 11A. In particular, when the first piece 1112 is coupled to the second piece 1104, as illustrated in FIG. 11E, a direction of the orientation 1113 of the first piece crosses a direction of the orientation 1105 of the second piece in a plan view.

Multiple sets 1100 can be joined together to form a multi-layer 1106 laminate structure, as shown in FIG. 11C, with each piece of densified wood having an orientation rotated 90° with respect to an adjacent piece. Similarly, multiple sets 1110 can be joined together to form a multi-layer 1116, 1118 laminate structure, as shown in FIG. 11F, with each piece of densified wood having an orientation different than that of adjacent piece, and/or each layer having a different composite orientation than that of adjacent layers.

Although a particular number of densified wood pieces for a laminated structure is illustrated in FIGS. 11A-11F, other numbers of densified wood pieces are also possible according to one or more contemplated embodiments. Moreover, although rectangular shapes are illustrated in FIGS. 11A-11F, other shapes are also possible according to one or more contemplated embodiments. Moreover, other orientations and alignments beyond those illustrated in FIGS. 11A-11F are also possible according to one or more contemplated embodiments. In some embodiments, the orientations of adjacent wood pieces may be aligned, for example, to enhance anisotropy.

Returning to FIG. 10A, after alignment 1006, the process 1000 can proceed to 1008, where the aligned densified wood pieces are joined together, for example, by glue/epoxy or by hydrogen bonding. In those embodiments where hydrogen bonding is used, the joining 1008 can include pressing the aligned pieces together under high pressure, similar to the pressing used to form the densified wood pieces. Once joined to form a laminate structure, the process 1000 can proceed to 1010, where the laminate is adapted for use (for example, as described above with respect to 114 of process 100) and/or used (for example, as described above with respect to 116 of process 100).

Figure 10B:
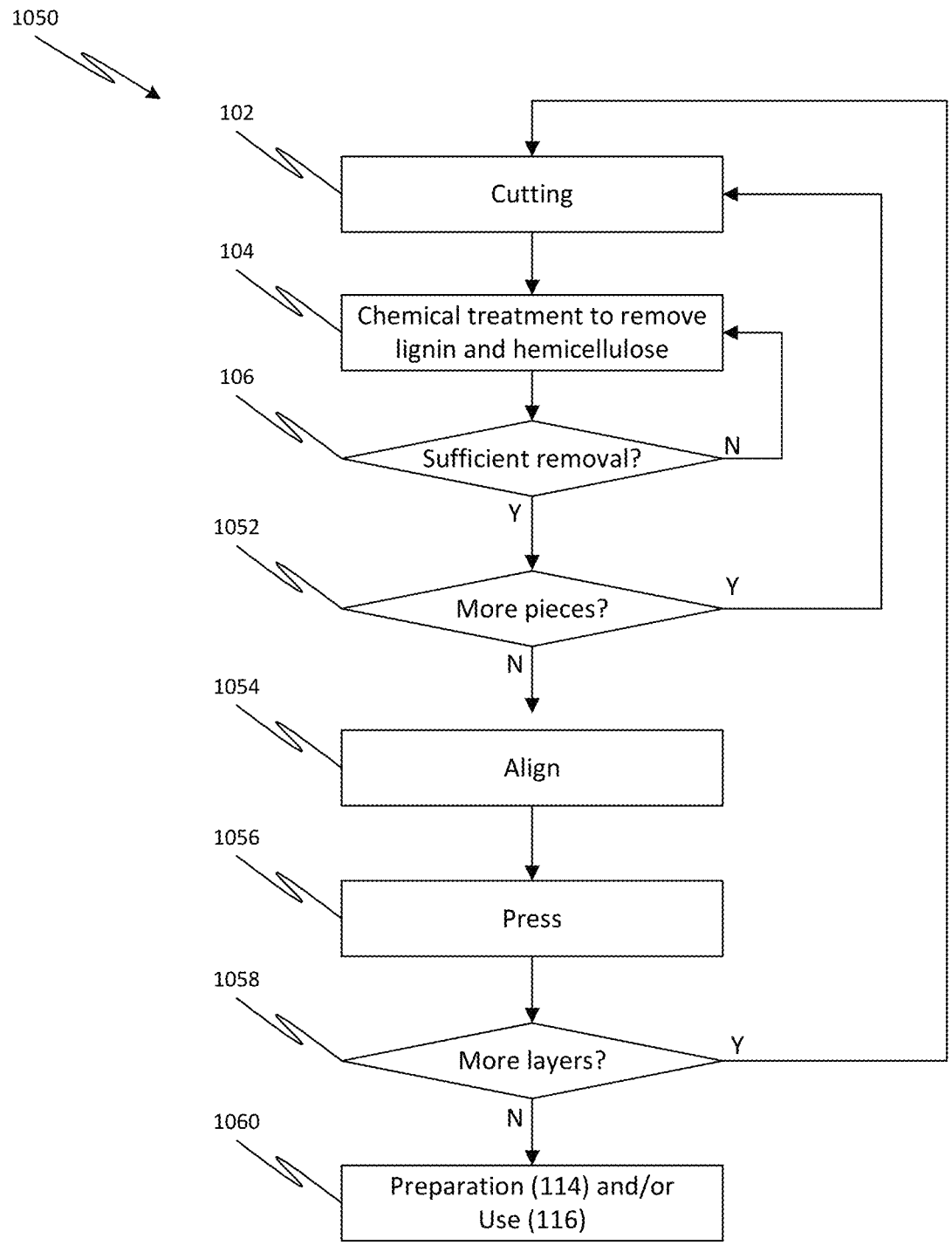
FIG. 10B another exemplary process flow diagram for fabricating laminate structures from strong and tough wood, according to one or more embodiments of the disclosed subject matter.

Although FIG. 10A forms the pieces of densified wood prior to joining, embodiments of the disclosed subject matter are not limited thereto. Rather, in other embodiments, the joining of wood pieces may be combined with the pressing to densify the wood pieces. FIG. 10B illustrates such a process 1050. Similar to process 100 of FIG. 1, process 1050 can include cutting 102 and chemical treatment 104 to remove sufficient lignin 106, and subsequent pressing 110 of the treated wood. These initial processes are repeated at 1052 to produce multiple separate pieces of chemically treated wood.

Once a sufficient number of chemically treated wood pieces have been prepared, the process 1050 can proceed to 1054, where the chemically treated wood pieces are arranged in preparation for joining. Each of the chemically treated wood pieces can have a respective orientation, which corresponds to the direction in which the lumina extend. The aligning 1054 can thus include arranging the chemically treated wood pieces such that at least some of the wood pieces have different orientations with respect to each other, as otherwise described above with respect to FIG. 10A and FIGS. 11A-11F.

After alignment 1054, the process 1050 can proceed to 1056, where the aligned chemically treated wood pieces are pressed together. The pressing 1056 is effective to compress each wood piece (i.e., to produce densified wood pieces) and to cause hydrogen bonding to form between facing surfaces of the wood pieces. The pressing 1056 thus simultaneously produces the densification and joining of the wood pieces to form a laminate structure. Further layers can be added to the laminate by repeating the cutting, chemical treatment, aligning, and pressing at 1058. Otherwise, the process 1050 can proceed to 1060, where the laminate is adapted for use and/or used, similar to process 1000.

Although rinsing, pre-pressing modification, and post-pressing modification have not been separately illustrated in FIGS. 10A-10B, it will be understood that these embodiments can also include rinsing, pre-pressing modification and/or post-pressing modification, similar to the process 100 of FIG. 1.

Figures 12A, 12B:
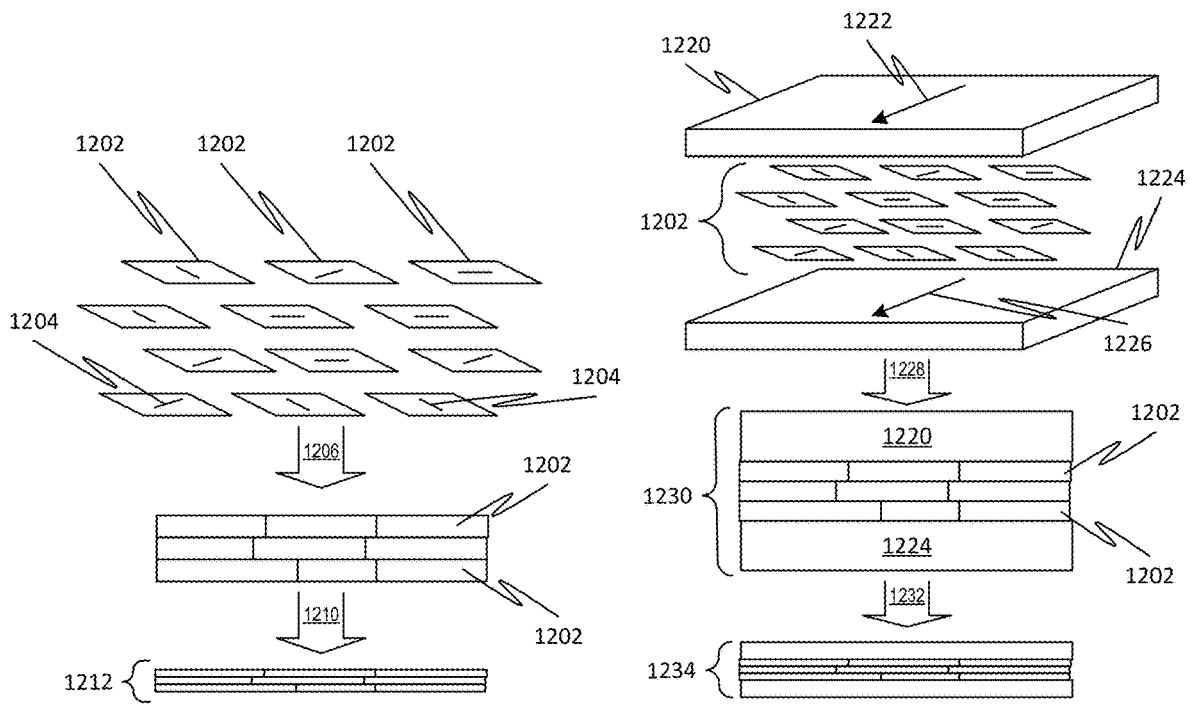
FIG. 12A is a simplified schematic illustration of an exemplary process for fabricating a strong and tough wood laminate from wood chips, according to one or more embodiments of the disclosed subject matter.
FIG. 12B is a simplified schematic illustration of an exemplary process for fabricating a strong and tough wood laminate from wood chips and wood sheets, according to one or more embodiments of the disclosed subject matter.

In some embodiments, a laminate structure can be formed from multiple wood chips with different fiber orientations. For example, FIG. 12A illustrates aspects of an exemplary fabrication process for forming a laminate of densified wood from individual wood chips 1202. The individual wood chips 1202 may have respective orientations 1204, which correspond to a direction of lumina extension and/or fiber alignment therein. Similar to the process 100 described above, the wood chips 1202 can be subject to chemical treatment to partially remove lignin therefrom and then assembled via 1206 into a multilayer structure. The assembly of the chemically modified wood chips can take into account the orientations 1204 of the chips 1202, for example, such that orientations are orthogonal as in FIGS. 11A-11B, crossing as in FIGS. 11D-11E, or otherwise aligned. Alternatively, the orientations 1204 can be random within the multilayer arrangement. The multilayer structure can then be pressed at 1210 to form a multilayer laminate 1212 of densified wood chips. Adjacent densified wood chips can be held together by hydrogen bonds formed during the pressing 1210.

In some embodiments, a laminate structure can be formed from wood sheets and multiple wood chips with different fiber orientations. For example, FIG. 12B illustrates aspects of an exemplary fabrication process for forming a laminate of densified wood from individual wood chips 1202 and at a pair of wood sheets 1220, 1224. The individual wood chips 1202 may have respective orientations 1204, which correspond to a direction of lumina extension and/or fiber alignment therein. Similarly, wood sheets 1220, 1224 can have respective orientations 1222, 1226 that correspond to a direction of lumina extension and/or fiber alignment therein.

Similar to the process 100 described above, the wood sheets 1220, 1224 and the wood chips 1202 can be subject to chemical treatment to partially remove lignin therefrom and then assembled via 1228 into a multilayer structure, with the wood chips 1202 arranged between the sheets 1220, 1224. The assembly can take into account the orientations of the sheets 1220, 1224 and the chips 1202. For example, the arrangement 1228 can be such that orientations 1204 of at least the chips 1202 are orthogonal as in FIGS. 11A-11B, crossing as in FIGS. 11D-11E, or otherwise aligned. Alternatively, the orientations 1204 of at least the chips 1202 can be random within the multilayer arrangement. In another example, the arrangement 1228 can be such that orientations 1222, 1226 of at least the sheets are orthogonal as in FIGS. 11A-11B, crossing as in FIGS. 11D-11E, or otherwise aligned. In such an example, the orientations 1204 of the wood chips 1202 may be aligned dependent on the orientations of at least one of the sheets 1220, 1224, or independent of the sheet orientation. For example, the orientations 1220, 1224 may be orthogonal to each other, whereas the orientations 1204 of the chips 1202 may be substantially random.

The multilayer structure 1230 can then be pressed at 1232 to form a multilayer laminate 1234 of densified wood. Adjacent pieces of the densified wood can be held together by hydrogen bonds formed during the pressing 1232. Although three layers of wood chips 1202 are shown between wood sheets 1220 and 1224, it also possible to provide fewer or additional layers of wood chips, for example a single layer of wood chips or more than three layers. Moreover, embodiments of the disclosed subject matter are not limited to the specific number and arrangement of sheets and chips illustrated in FIGS. 12A-12B. For example, laminate 1234 may comprise a layer unit in a multilayer structure, where densified sheet 1224 of one unit 1234 is atop and coupled to densified sheet 1220 of an adjacent unit 1234. In another example, a multilayered laminate structure may include repeating layers of sheet 1220 (or sheet 1224) with intervening layers of wood chips 1202.

The processes of FIGS. 12A-12B can result in continuous wooden structures (e.g., a densified wood board 1212 or densified wood board 1234) with less anisotropy due to the random or aligned arrangement of orientations. Thus, small wood chips, which may have different sizes and orientations from each other, can be combined into a larger densified wood product. Indeed, such laminate structures are readily scalable for use in different applications and/or different sizes.

Although rinsing, pre-pressing modification, and post-pressing modification have not been separately illustrated in FIGS. 12A-12B, it will be understood that these embodiments can also include rinsing, pre-pressing modification and/or post-pressing modification, similar to the process 100 of FIG. 1. Although a particular number of densified wood chips or sheets for a laminated structure is illustrated in FIGS. 12A-12B, other numbers of densified wood chips or sheets are also possible according to one or more contemplated embodiments. Moreover, although rectangular shapes are illustrated in FIGS. 12A-12B, other shapes are also possible according to one or more contemplated embodiments. Indeed, wood chips may have irregular or different shapes/sizes prior to being combined into the laminate structure. In addition, other orientations and alignments beyond those illustrated in FIGS. 12A-12B are also possible according to one or more contemplated embodiments. In some embodiments, the orientations of adjacent pieces (whether wood chips 1202 or sheets 1220, 1224) may be aligned, for example, to enhance anisotropy.

In one or more first embodiments, a structure comprises a first piece of natural plant material that has that has been chemically treated to partially remove lignin therein while substantially preserving a structure of cellulose-based lumina and further subjected to pressing in a first direction perpendicular to a direction of extension of the lumina such that the lumina at least partially collapse.

In the first embodiments or any other embodiment, the natural plant material is natural wood.

In the first embodiments or any other embodiment, the first piece has a thickness in said first direction that is at least 10% reduced as compared to that of the natural wood. In the first embodiments or any other embodiment, the first piece has a thickness in said first direction that is at least 30% reduced as compared to that of the natural wood. In the first embodiments or any other embodiment, the first piece has a thickness in said first direction that is at least 60% reduced as compared to that of the natural wood. In the first embodiments or any other embodiment, the first piece has a thickness in said first direction that is at least 70% reduced as compared to that of the natural wood. In the first embodiments or any other embodiment, the first piece has a thickness in said first direction that is at least 80% reduced as compared to that of the natural wood.

In the first embodiments or any other embodiment, the first piece retains at least some lignin. In the first embodiments or any other embodiment, between 1% and 99% of the lignin in the natural plant material has been removed by the chemical treatment. In the first embodiments or any other embodiment, between 5% and 95% of the lignin in the natural plant material has been removed by the chemical treatment.

In the first embodiments or any other embodiment, between 23% and 60% of the lignin in the natural plant material has been removed by the chemical treatment. In the first embodiments or any other embodiment, the first piece retains about 55% of the lignin from the natural plant material after the chemical treatment.

In the first embodiments or any other embodiment, facing portions of the collapsed lumina in the first piece are held together by hydrogen bonds.

In the first embodiments or any other embodiment, the first piece has an increased tensile strength, flexural strength, ductility, fracture toughness, scratch hardness, hardness modulus, impact toughness, compressive strength and/or elastic stiffness as compared to the natural plant material before the chemical treatment.

In the first embodiments or any other embodiment, the tensile strength of the first piece is at least 2 times greater than that of the natural plant material before the chemical treatment. In the first embodiments or any other embodiment, the tensile strength of the first piece is at least 5 times greater than that of the natural plant material before the chemical treatment. In the first embodiments or any other embodiment, the tensile strength of the first piece is at least 350 MPa.

In the first embodiments or any other embodiment, the ductility of the first piece is the same as or at least 10 times greater that of the natural plant material before the chemical treatment. In the first embodiments or any other embodiment, the ductility of the first at least 50 times greater than that of the natural plant material before the chemical treatment.

In the first embodiments or any other embodiment, the fracture toughness of the first piece is at least 2 times greater than that of the natural plant material before the chemical treatment. In the first embodiments or any other embodiment, the fracture toughness of the first piece is at least 5 times greater than that of the natural plant material before the chemical treatment.

In the first embodiments or any other embodiment, the elastic stiffness of the first piece is at least 5 times greater than that of the natural plant material before the chemical treatment. In the first embodiments or any other embodiment, the elastic stiffness of the first piece is at least 10 times greater than that of the natural plant material before the chemical treatment.

In the first embodiments or any other embodiment, the scratch hardness of the first piece is at least 5 times greater than that of the natural plant material before the chemical treatment. In the first embodiments or any other embodiment, the scratch hardness of the first piece is at least 10 times greater than that of the natural plant material before the chemical treatment.

In the first embodiments or any other embodiment, the impact toughness of the first piece is at least 2.5 times greater than that of the natural plant material before the chemical treatment. In the first embodiments or any other embodiment, the impact toughness of the first piece is at least 5 times greater than that of the natural plant material before the chemical treatment.

In the first embodiments or any other embodiment, the hardness modulus of the first piece is at least 5 times greater than that of the natural plant material before the chemical treatment. In the first embodiments or any other embodiment, the hardness modulus of the first piece is at least 10 times greater than that of the natural plant material before the chemical treatment.

In the first embodiments or any other embodiment, the flexural strength of the first piece along the direction of extension is at least 5 times greater than that of the natural plant material before the chemical treatment, and the flexural strength of the first piece perpendicular to the direction of extension is at least 5 times greater than that of the natural plant material before the chemical treatment.

In the first embodiments or any other embodiment, the flexural strength of the first piece along the direction of extension is a first multiple greater than that of the natural plant material before the chemical treatment, the flexural strength of the first piece perpendicular to the direction of extension is a second multiple greater than that of the natural plant material before the chemical treatment, and the second multiple is greater than the first multiple. In the first embodiments or any other embodiment, the flexural strength of the first piece along the direction of extension is at least 5 times greater than that of the natural plant material before the chemical treatment, and the flexural strength of the first piece perpendicular to the direction of extension is at least 10 times greater than that of the natural plant material before the chemical treatment.

In the first embodiments or any other embodiment, the compressive strength of the first piece along the direction of extension is at least 5 times greater than that of the natural plant material before the chemical treatment, and the compressive strength of the first piece perpendicular to the direction of extension is at least 5 times greater than that of the natural plant material before the chemical treatment.

In the first embodiments or any other embodiment, the compressive strength of the first piece along the direction of extension is a first multiple greater than that of the natural plant material before the chemical treatment, the compressive strength of the first piece perpendicular to the direction of extension is a second multiple greater than that of the natural plant material before the chemical treatment, and the second multiple is greater than the first multiple. In the first embodiments or any other embodiment, the compressive strength of the first piece along the direction of extension is at least 5 times greater than that of the natural plant material before the chemical treatment, and the compressive strength of the first piece perpendicular to the direction of extension is at least 30 times greater than that of the natural plant material before the chemical treatment.

In the first embodiments or any other embodiment, the first piece has an increased density as compared to the natural plant material before the chemical treatment. In the first embodiments or any other embodiment, the density of the first piece is at least 1.5 times greater than that of the natural plant material before the chemical treatment. In the first embodiments or any other embodiment, the density of the first piece is at least 2 times greater than that of the natural plant material before the chemical treatment.

In the first embodiments or any other embodiment, the first piece has a specific tensile strength greater than 300 MPa cm$^3$/g. In the first embodiments or any other embodiment, the first piece has a specific tensile strength of about 450 MPa cm$^3$/g.

In the first embodiments or any other embodiment, cellulose nanofibers of the collapsed lumina are substantially aligned along the direction of extension.

In the first embodiments or any other embodiment, the first piece is substantially free of any gaps between walls of the lumina in a cross-sectional view.

In the first embodiments or any other embodiment, the natural plant material comprises bamboo or natural wood. In the first embodiments or any other embodiment, the natural wood comprises hardwood or softwood. In the first embodiments or any other embodiment, the natural wood comprises at least one of basswood, oak, poplar, ash, alder, aspen, balsa wood, beech, birch, cherry, butternut, chestnut, cocobolo, elm, hickory, maple, oak, padauk, plum, walnut, willow, yellow-poplar, bald cypress, cedar, cypress, douglas fir, fir, hemlock, larch, pine, redwood, spruce, tamarack, juniper, and yew.

In the first embodiments or any other embodiment, the structure further comprises a second piece of natural wood that has been chemically treated to partially remove lignin therein while substantially preserving a structure of cellulose-based lumina and further subject to pressing in a direction crossing a direction of extension of the lumina such that the lumina at least partially collapse. The first and second pieces are coupled to each other along facing surfaces, and the direction of extension of the lumina of the first piece crosses the direction of extension of the lumina of the second piece, for example, in plan view.

In the first embodiments or any other embodiment, the direction of extension of the lumina of the first piece is orthogonal to the direction of extension of the lumina of the second piece.

In the first embodiments or any other embodiment, the first and second pieces are coupled to each other by hydrogen bonding between their facing surfaces. In the first embodiments or any other embodiment, the first and second pieces are coupled to each other by glue or epoxy between their facing surfaces.

In the first embodiments or any other embodiment, each of the first and second pieces is formed as a flat sheet, a block, a stick, a strip, a hollow shape, a membrane, a thin film with thickness less than 200 μm, a wood chip, or a wood flake.

In the first embodiments or any other embodiment, the structure further comprises a plurality of additional first and second pieces coupled together with the first and second pieces to form a multilayer laminated structure.

In the first embodiments or any other embodiment, the first piece includes non-native particles incorporated within the collapsed lumina and/or external surfaces of the first piece. In the first embodiments or any other embodiment, the non-native particles comprise hydrophobic nanoparticles. In the first embodiments or any other embodiment, the nanoparticles comprise $SiO_2$ nanoparticles. In the first embodiments or any other embodiment, the non-native particles cause the first piece to be hydrophobic. In the first embodiments or any other embodiment, the first piece has a static contact angle of at least 90°, or a dynamic contact angle less than 10°. In the first embodiments or any other embodiment, the first piece has a static contact angle greater than 150° and a dynamic contact angle less than 5°.

In the first embodiments or any other embodiment, the first piece has been chemically treated so as to be hydrophobic. In the first embodiments or any other embodiment, the hydrophobic chemical treatment comprises at least one of epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

In the first embodiments or any other embodiment, the first piece has been chemically treated so as to be resistant to weather or salt water. In the first embodiments or any other embodiment, the chemical treatment for resistance to weather or salt water comprises at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolinate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13}.4H_2O$.

In the first embodiments or any other embodiment, the structure further comprises a coating on one or more external surfaces of the first piece. In the first embodiments or any other embodiment, the coating comprises an oil-based paint, a hydrophobic paint, a polymer coating, or a fire-resistant coating. In the first embodiments or any other embodiment, the fire-resistant coating includes at least one of boron nitride, montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide.

In the first embodiments or any other embodiment, the first piece includes a polymer therein (e.g., within fully or partially collapsed lumina).

In the first embodiments or any other embodiment, the lumina within the first piece are fully collapsed.

In one or more second embodiments, a method comprises treating a piece of natural plant material with a chemical solution so as to partially remove lignin therein while substantially preserving a structure of cellulose-based lumina, the lumina extending in a first direction, and after the treating, pressing the piece of chemically-treated plant material in a second direction crossing the first direction for a first time such that the lumina at least partially collapse.

In the second embodiments or any other embodiment, the natural plant material is natural wood.

In the second embodiments or any other embodiment, the pressing is performed at a temperature between 20° C. and 120° C. and at a pressure between 0.5 MPa and 10 MPa. In the second embodiments or any other embodiment, the pressing is performed at a temperature of about 100° C. and a pressure of about 5 MPa.

In the second embodiments or any other embodiment, the first time is at least 5 minutes. In the second embodiments or any other embodiment, the first time is at least 1 hour. In the second embodiments or any other embodiment, the first time is at least 12 hours. In the second embodiments or any other embodiment, the first time is at least 24 hours.

In the second embodiments or any other embodiment, the pressing is effective to remove at least water from the chemically-treated plant material.

In the second embodiments or any other embodiment, the pressing is performed after the treating without any intermediate drying step.

In the second embodiments or any other embodiment, the chemical solution comprises at least one of NaOH, $Na_2S$, $NaHSO_3$, $SO_2$, $H_2O$, $Na_2SO_3$, Anthraquinone (AQ), $Na_2S_n$ (where n is an integer), $CH_3OH$, $C_2H_5OH$, $C_4H_9OH$, HCOOH, $NH_3$, p-TsOH, $NH_3$—$H_2O$, $H_2O_2$, NaClO, $NaClO_2$, $CH_3COOH$ (acetic acid), $ClO_2$, and $Cl_2$. In the second embodiments or any other embodiment, the chemical solution comprises a mixture of NaOH and $Na_2SO_3$. In the second embodiments or any other embodiment, the chemical solution comprises 2.5M of NaOH and 0.4M of $Na_2SO_3$. In the second embodiments or any other embodiment, the chemical solution is boiling.

In the second embodiments or any other embodiment, the method further comprises, before the pressing and after the treating, immersing the piece of chemically-treated plant material in a solvent to remove remnants of the chemical solution in said piece. In the second embodiments or any other embodiment, the solvent comprises boiling de-ionized (DI) water.

In the second embodiments or any other embodiment, the treating comprises immersing the piece of natural plant material in the chemical solution for at least 30 minutes. In the second embodiments or any other embodiment, the treating comprises immersing the piece of natural plant material in the chemical solution for at least one hour. In the second embodiments or any other embodiment, the piece of natural plant material is immersed in the chemical solution for between 0.1 hours and 72 hours, inclusive. In the second embodiments or any other embodiment, the treating is performed under vacuum, such that the chemical solution penetrates into the lumina of the piece of natural plant material.

In the second embodiments or any other embodiment, at least some of the hemicellulose and lignin are retained by said piece after the treating. In the second embodiments or any other embodiment, between 1% and 99% of the lignin has been removed from said piece by the treating. In the second embodiments or any other embodiment, between 5% and 95% of the lignin has been removed from said piece by the treating.

In the second embodiments or any other embodiment, after the pressing, the lumina within the piece of chemically-treated plant material are fully collapsed.

In the second embodiments or any other embodiment, the method further comprises, prior to the pressing, introducing a polymer into the lumina, wherein after the pressing the polymer is disposed within the plant material (e.g., within the partially or fully collapsed lumina).

In the second embodiments or any other embodiment, the method further comprises, after the pressing, coating one or more external surfaces of said piece. In the second embodiments or any other embodiment, the coating comprises an oil-based paint, a hydrophobic paint, a polymer coating, or a fire-resistant coating. In the second embodiments or any other embodiment, the fire-resistant coating includes at least one of boron nitride, montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide.

In the second embodiments or any other embodiment, the method further comprises, prior to the pressing, depositing a plurality of non-native particles on inners surfaces of the lumina, wherein after the pressing the non-native particles are incorporated into the collapsed lumina. In the second embodiments or any other embodiment, the non-native particles comprise hydrophobic nanoparticles. In the second embodiments or any other embodiment, the nanoparticles comprise $SiO_2$ nanoparticles.

In the second embodiments or any other embodiment, the non-native particles cause the piece of chemically-treated plant material to be hydrophobic. In the second embodiments or any other embodiment, after the pressing, the piece of chemically-treated plant material has a static contact angle of at least 90°, or a dynamic contact angle less than 10°. In the second embodiments or any other embodiment, after the pressing, the piece of chemically-treated wood has a static contact angle greater than 150° and a dynamic contact angle less than 5°.

In the second embodiments or any other embodiment, the method further comprises, after the treating, subjecting the chemically treated plant material to a further chemical treatment so as to make the plant material hydrophobic. In the second embodiments or any other embodiment, the treating to make hydrophobic can occur prior to (b). In the second embodiments or any other embodiment, the hydrophobic chemical treatment comprises at least one of epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

In the second embodiments or any other embodiment, the method further comprises, after the treating to partially remove lignin, subjecting the chemically treated wood to a further chemical treatment to improve resistance to weather or salt water. In the second embodiments or any other embodiment, the chemical treatment for resistance to weather or salt water comprises at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolinate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13}.4H_2O$.

In the second embodiments or any other embodiment, cellulose nanofibers of the collapsed lumina are substantially aligned along the first direction. In the second embodiments or any other embodiment, after the pressing, said piece is substantially free of any gaps between walls of the lumina in a cross-sectional view.

In the second embodiments or any other embodiment, the natural plant material comprises bamboo or a natural wood. In the second embodiments or any other embodiment, the natural wood comprises hardwood or softwood. In the second embodiments or any other embodiment, the natural wood comprises at least one of basswood, oak, poplar, ash, alder, aspen, balsa wood, beech, birch, cherry, butternut, chestnut, cocobolo, elm, hickory, maple, oak, padauk, plum, walnut, willow, yellow-poplar, bald cypress, cedar, cypress, douglas fir, fir, hemlock, larch, pine, redwood, spruce, tamarack, juniper, and yew.

In the second embodiments or any other embodiment, after the pressing, at least one tensile strength, flexural strength, ductility, fracture toughness, scratch hardness, hardness modulus, impact toughness, compressive strength, and elastic stiffness of said piece is increased as compared to the natural wood before the treating.

In the second embodiments or any other embodiment, after the pressing, said piece has a density that is at least 2 times greater than that of the natural wood before the treating, and a thickness in the second direction that is at least 60% reduced as compared to that of the natural plant material before the treating. In the second embodiments or any other embodiment, the thickness of said piece after the pressing is at least 70% reduced as compared to that of the natural wood.

In the second embodiments or any other embodiment, the pressing includes forming hydrogen bonds between facing portions of the collapsed lumina.

In the second embodiments or any other embodiment, said piece is formed as a flat sheet, a block, a stick, a strip, a membrane, a thin film, a hollow shape, a wood chip, or a wood flake. In the second embodiments or any other embodiment, the thin film has a thickness of 200 µm or less.

In the second embodiments or any other embodiment, the method further comprises repeating the treatment to remove lignin and the pressing one or more additional pieces of natural plant material, and coupling together the resulting pieces of pressed chemically-treated plant material.

In the second embodiments or any other embodiment, respective first directions of at least some of the coupled pieces of pressed chemically-treated plant material cross each other (e.g., in plan view). In the second embodiments or any other embodiment, the crossing first directions are orthogonal to each other.

In the second embodiments or any other embodiment, the coupling comprises further pressing the pieces of pressed chemically-treated plant material together such that facing surfaces are hydrogen bonded.

In the second embodiments or any other embodiment, after each treatment to partially remove lignin, arranging the chemically-treated piece in contact with other chemically-treated pieces. The pressing can be performed simultaneously for the arranged pieces so as to effect the coupling together.

In the second embodiments or any other embodiment, the coupling comprises applying glue or epoxy to facing surfaces of the pieces of chemically-treated plant material.

In the second embodiments or any other embodiment, the method further comprises, after pressing, machining the piece of chemically-treated plant material or forming the piece of chemically-treated plant material into a desired shape or configuration.

In one or more third embodiments, a structure comprises a piece of densified wood where lumina therein are completely collapsed without any gaps between cell walls of the lumina in a cross-sectional view.

In the third embodiments or any other embodiment, the piece of densified wood has been compacted by a ratio of at least 5 to 2. In the third embodiments or any other embodiment, the piece of densified wood has been compacted by a ratio of about 5 to 1.

In the third embodiments or any other embodiment, the piece of densified wood contains less lignin than natural wood used to form said piece. In the third embodiments or any other embodiment, the piece of densified wood contains between 1% and 99% of the lignin in the natural wood. In the third embodiments or any other embodiment, the piece of densified wood contains between 5% and 95% of the lignin in the natural wood. In the third embodiments or any other embodiment, the piece of densified wood contains between 1% and 25% lignin. In the third embodiments or any other embodiment, the piece of densified wood contains between 5% and 16% lignin.

In the third embodiments or any other embodiment, the piece of densified wood has an increased tensile strength, flexural strength, ductility, fracture toughness, scratch hardness, hardness modulus, impact toughness, compressive strength and/or elastic stiffness as compared to the natural wood used to form said piece.

In the third embodiments or any other embodiment, the piece of densified wood has a specific tensile strength of at least 300 MPa cm$^3$/g.

In one or more fourth embodiments, a laminate comprises a plurality of pieces of densified wood. Each piece has at least partially collapsed lumina in cross-sectional view. The lumina of each piece extend in a respective extension direction. The extension directions of at least some of the pieces of densified wood intersect each other, and the plurality of pieces of densified wood are coupled together.

In the fourth embodiments or any other embodiment, each piece has completely collapsed lumina without any gaps between walls of the lumina in cross-sectional view.

In the fourth embodiments or any other embodiment, the adjacent pieces of densified wood are coupled to each other along facing surfaces. In the fourth embodiments or any other embodiment, the adjacent pieces are coupled together by hydrogen bonding between the facing surfaces. In the fourth embodiments or any other embodiment, the adjacent pieces are coupled together by glue or epoxy between the facing surfaces.

In the fourth embodiments or any other embodiment, a first set of the pieces of densified wood is disposed in a first layer, a second set of the pieces of densified wood is disposed in a second layer over the first layer, and the first and second layers are coupled to each other via facing surfaces between adjacent pieces from the respective layers.

In the fourth embodiments or any other embodiment, the extension directions of an adjacent pair of the pieces of densified wood cross each other (i.e., in plan view). In the fourth embodiments or any other embodiment, the extension directions of an adjacent pair of the pieces of densified wood are orthogonal to each other.

In the fourth embodiments or any other embodiment, each piece of densified wood has been compacted by a ratio of at least 5 to 2. In the fourth embodiments or any other embodiment, each piece of densified wood has been compacted by a ratio of about 5 to 1.

In the fourth embodiments or any other embodiment, each piece of densified wood contains less lignin than natural wood used to form said piece. In the fourth embodiments or any other embodiment, each piece of densified wood contains between 1% and 99% of the lignin in the natural wood. In the fourth embodiments or any other embodiment, each piece of densified wood contains between 5% and 95% of the lignin in the natural wood.

In the fourth embodiments or any other embodiment, each piece of densified wood contains between 1% and 25% lignin. In the fourth embodiments or any other embodiment, each piece of densified wood contains between 5% and 16% lignin.

In the fourth embodiments or any other embodiment, each piece of densified wood has an increased tensile strength, flexural strength, ductility, fracture toughness, scratch hardness, hardness modulus, impact toughness, compressive strength and/or elastic stiffness as compared to the natural wood used to form said piece.

In the fourth embodiments or any other embodiment, each piece of densified wood is formed as a flat sheet, a block, a stick, a strip, a hollow shape, a membrane, a thin film with thickness less than 200 µm, a wood chip, or a wood flake.

In the fourth embodiments or any other embodiment, each piece of densified wood has a specific tensile strength of at least 300 MPa cm$^3$/g.

In one or more fifth embodiments, a material comprises the structure of the first or third embodiments, the laminate of the fourth embodiments, or a structure formed by the method of the third embodiments.

In one or more sixth embodiments, the material of the fifth embodiments are formed as an interior or exterior component of an automobile, a train, a truck, a plane, boat, ship, or any other transport, vehicle, or conveyance.

In one or more sixth embodiments, the material of the fifth embodiments forms a part of a container, box, or shipping crate.

In one or more sixth embodiments, the material of the fifth embodiments are formed as an interior or exterior component of a warehouse, factory, office building, barn, home, or any other building or structure. In one or more sixth embodiments, the material of the fifth embodiments forms a part of a display, decoration, window frame, picture frame, door or door frame, table, desk, chair, cabinet, wardrobe, bed, or any other piece of furniture or home accent. In one or more sixth embodiments, the material of the fifth embodiments forms a part of a bridge, dock, deck, or platform. In one or more sixth embodiments, the material of the fifth embodiments forms a part of a musical instrument. In one or more sixth embodiments, the material of the fifth embodiments forms a part of a protective cover, blast shield, or other protective device. In one or more sixth embodiments, the material of the fifth embodiments forms a part of a tool, athletic equipment, or sporting good.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting.

It is thus apparent that there is provided, in accordance with the present disclosure, strong and tough structural wood materials, and methods for fabricating and use thereof. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A structure comprising:
   a first piece of natural fibrous plant that has been chemically treated to remove between 5% and 95% of lignin therein while substantially preserving a structure of cellulose-based lumina and further subjected to pressing in a first direction crossing a direction of extension of the lumina such that the lumina collapse,
   wherein facing portions of the collapsed lumina in the first piece are in contact with each other.

2. The structure of claim 1, wherein the first piece has a thickness in said first direction that is at least 60% reduced as compared to that of the natural fibrous plant.

3. The structure of claim 1, wherein a tensile strength of the first piece is at least 350 MPa.

4. The structure of claim 1, wherein the natural fibrous plant comprises bamboo.

5. The structure of claim 1, further comprising:
   a second piece of natural fibrous plant that has been chemically treated to remove between 5% and 95% of lignin therein while substantially preserving a structure of cellulose-based lumina and further subject to pressing in a direction crossing a direction of extension of the lumina such that the lumina collapse,
   wherein facing portions of the collapsed lumina in the second piece are in contact with each other, and
   the first and second pieces are coupled to each other along facing surfaces.

6. The structure of claim 5, wherein the facing surfaces of the first and second pieces are coupled to each other via glue, epoxy, or hydrogen bonding.

7. The structure of claim 5, wherein the direction of extension of the lumina of the first piece crosses the direction of extension of the lumina of the second piece.

8. The structure of claim 5, wherein the direction of extension of the lumina of the first piece is parallel to the direction of extension of the lumina of the second piece.

9. The structure of claim 1, wherein the first piece includes non-native hydrophobic particles disposed (i) within the collapsed lumina, (ii) on external surfaces of the first piece, or (i) and (ii).

10. The structure of claim 1, wherein the first piece has been chemically treated so as to be (i) hydrophobic, (ii) resistant to weather or salt water, or both (i) and (ii).

11. The structure of claim 1, wherein the natural fibrous plant comprises hardwood or softwood.

12. The structure of claim 11, wherein a content of the lignin in the first piece is 5-16 wt %.

13. The structure of claim 1, adjacent cellulose nanofibers of the facing portions of the collapsed lumina in the first piece are held together by hydrogen bonds.

14. A structure comprising:
   a first piece of natural fibrous plant that has been chemically treated to remove between 5% and 95% of lignin therein while substantially preserving a structure of cellulose-based lumina and further subjected to pressing in a first direction crossing a direction of extension of the lumina such that the lumina at least partially collapse, wherein a tensile strength of the first piece is at least 350 MPa, and a density of the first piece is at least 1.20 g/cm$^3$.

15. The structure of claim 1, wherein cellulose nanofibers in the first piece are substantially aligned along the direction of extension.

16. The structure of claim 14, wherein the natural fibrous plant comprises bamboo.

17. The structure of claim 14, wherein the natural fibrous plant comprises hardwood or softwood.

18. The structure of claim 17, wherein a content of the lignin in the first piece is 5-16 wt %.

19. A method comprising:
(a) treating a first piece of natural fibrous plant material with a chemical solution so as to remove between 5% and 95% of lignin therein while substantially preserving a structure of cellulose-based lumina, the lumina extending in a first direction; and
(b) after the treating, pressing the first piece in a second direction crossing the first direction such that the lumina collapse, facing portions of the collapsed lumina in the first piece after the pressing are in contact with each other.

20. The method of claim 19, wherein:
(i) the chemical solution comprises at least one of NaOH, Na$_2$S, NaHSO$_3$, SO$_2$, H$_2$O, Na$_2$SO$_3$, Anthraquinone (AQ), Na$_2$S$_n$ (where n is an integer), CH$_3$OH, C$_2$H$_5$OH, C$_4$H$_9$OH, HCOOH, NH$_3$, p-TsOH, NH$_3$—H$_2$O, H$_2$O$_2$, NaClO, NaClO$_2$, CH$_3$COOH (acetic acid), ClO$_2$, and Cl$_2$;
(ii) the pressing is performed at a temperature between 20° C. and 120° C. and at a pressure between 0.5 MPa and 10 MPa; or
both (i) and (ii).

21. The method of claim 19, further comprising, after the treating of (a), providing an oil-based paint, a hydrophobic paint, a polymer coating, a fire-resistant coating, non-native hydrophobic particles, or any combination of the foregoing over internal and/or external surfaces of the first piece.

22. The method of claim 19, further comprising, after the treating of (a), subjecting the first piece to a further chemical treatment so as to make the fibrous plant material (i) hydrophobic, (ii) resistant to weather or salt water, or both (i) and (ii).

23. A laminate comprising:
a plurality of pieces of densified fibrous plant materials, at least one of the plurality of pieces being a first piece of natural fibrous plant material that has been chemically treated to remove between 5% and 95% of lignin therein while substantially preserving a structure of cellulose-based lumina and further subjected to pressing in a first direction crossing a direction of extension of the lumina such that the lumina collapse,
wherein facing portions of the collapsed lumina in the first piece are in contact with each other, and
the plurality of pieces of densified fibrous plant materials are coupled together.

24. The laminate of claim 23, wherein the fibrous plant materials comprise bamboo.

25. The laminate of claim 23, wherein:
at least another of the plurality of pieces is a second piece of natural fibrous plant material that has been chemically treated to remove between 5% and 95% of lignin therein while substantially preserving a structure of cellulose-based lumina and further subject to pressing in a direction crossing a direction of extension of the lumina such that the lumina collapse, and
facing portions of the collapsed lumina in the second piece are in contact with each other.

26. The laminate of claim 25, wherein the direction of extension of the lumina of the first piece is parallel to the direction of extension of the lumina of the second piece.

27. The laminate of claim 25, wherein facing surfaces of the first and second pieces are coupled to each other via glue, epoxy, or hydrogen bonding.

28. The laminate of claim 23, wherein the fibrous plant materials comprise hardwood or softwood.

29. The laminate of claim 28, wherein a content of the lignin in the first piece is 5-16 wt %.

30. The laminate of claim 23, wherein adjacent cellulose nanofibers of the facing portions of the collapsed lumina in the first piece are held together by hydrogen bonds.

* * * * *